(12) United States Patent
Chachick et al.

(10) Patent No.: US 12,340,222 B2
(45) Date of Patent: Jun. 24, 2025

(54) PROCESSOR OPERAND MANAGEMENT USING FUSION BUFFER

(71) Applicant: Apple Inc., Cupertino, CA (US)

(72) Inventors: Ran Aharon Chachick, Seattle, WA (US); Rajdeep L. Bhuyar, San Jose, CA (US); Kanghong Yan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/628,403

(22) Filed: Apr. 5, 2024

(65) Prior Publication Data

US 2025/0103338 A1    Mar. 27, 2025

Related U.S. Application Data

(60) Provisional application No. 63/585,821, filed on Sep. 27, 2023, provisional application No. 63/585,811, filed on Sep. 27, 2023.

(51) Int. Cl.
*G06F 9/30* (2018.01)

(52) U.S. Cl.
CPC ...... *G06F 9/30181* (2013.01); *G06F 9/30032* (2013.01); *G06F 9/30043* (2013.01)

(58) Field of Classification Search
None
See application file for complete search history.

(56) References Cited

U.S. PATENT DOCUMENTS 10,216,516 B2 *   2/2019   Winkel ................ G06F 9/3017
10,579,389 B2 *   3/2020   Caulfield ............. G06F 9/3802
(Continued)

FOREIGN PATENT DOCUMENTS

CN         114528024 A        5/2022
TW         200638264 A        11/2006
WO      WO-2020024759 A1 *   2/2020    ........... G06F 9/3001

OTHER PUBLICATIONS

'Exploring Instruction Fusion Opportunities in General Purpose Processors' by Singh et al., 55th IEEE/ACM International Symposium on Microarchitecture (MICRO 2022), Oct. 2022. (Year: 2022).*

(Continued)

*Primary Examiner* — Steven G Snyder
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed involving operand management using a fusion buffer. A processor includes operand management circuitry, where the operand management circuitry includes a fusion buffer, and execution circuitry. In one embodiment, the operand management circuitry is configured to detect a first storage instruction operation that is executable to store operand values usable by one or more consumer instruction operations and store the first storage instruction operation in the fusion buffer. In response to detecting a drop condition associated with the first storage instruction operation, the operand management circuitry is configured to remove the first storage instruction operation from the fusion buffer without forwarding the first storage instruction operation for execution. In response to detecting a buffer vacate condition and not detecting the drop condition the operand management circuitry is configured to forward the first storage instruction operation for execution by the execution circuitry.

20 Claims, 20 Drawing Sheets

(56) References Cited

U.S. PATENT DOCUMENTS

| | | | |
|---|---|---|---|
| 10,956,155 B2* | 3/2021 | Kitchin | G06F 9/3826 |
| 11,157,280 B2* | 10/2021 | Boersma | G06F 9/3016 |
| 11,249,757 B1* | 2/2022 | Lloyd | G06F 9/3853 |
| 11,256,509 B2* | 2/2022 | Silberman | G06F 9/3853 |
| 11,416,252 B2* | 8/2022 | Vasekin | G06F 9/3867 |
| 2014/0281397 A1* | 9/2014 | Loktyukhin | G06F 9/30181 |
| | | | 712/208 |
| 2017/0083314 A1 | 3/2017 | Burger et al. | |
| 2017/0123808 A1* | 5/2017 | Caulfield | G06F 9/3836 |
| 2018/0095761 A1* | 4/2018 | Winkel | G06F 9/30043 |
| 2018/0129498 A1 | 5/2018 | Levison et al. | |
| 2018/0267798 A1 | 9/2018 | Grisenthwaite et al. | |
| 2019/0179639 A1* | 6/2019 | Boersma | G06F 9/3016 |
| 2019/0179640 A1* | 6/2019 | Silberman | G06F 9/3853 |
| 2019/0196832 A1* | 6/2019 | Vasekin | G06F 9/30181 |
| 2019/0310852 A1 | 10/2019 | Burger et al. | |
| 2020/0042322 A1 | 2/2020 | Wang et al. | |
| 2020/0183687 A1 | 6/2020 | Asanovic et al. | |
| 2022/0019436 A1 | 1/2022 | Lloyd et al. | |
| 2022/0137976 A1 | 5/2022 | Golla et al. | |
| 2022/0283814 A1 | 9/2022 | Kim et al. | |
| 2022/0398100 A1* | 12/2022 | Tekmen | G06F 9/3802 |

OTHER PUBLICATIONS

International Search Report and Written Opinion in PCT Appl. No. PCT/US2024/045010 mailed Dec. 10, 2024, 8 pages.
Office Action in ROC (Taiwan) Pat. Appln. No. 113135782 mailed May 7, 2025, 3 pages.

* cited by examiner

PROCESSOR OPERAND MANAGEMENT USING FUSION BUFFER

CROSS-REFERENCE TO RELATED APPLICATIONS

This application claims priority to U.S. Provisional App. No. 63/585,811 entitled "Processor Operand Management Using Fusion Buffer," filed Sep. 27, 2023 and U.S. Provisional App. No. 63/585,821 entitled "Interleave Execution Circuit," filed Sep. 27, 2023. Each of the above-referenced applications is hereby incorporated by reference herein in its entirety.

This application is related to the following U.S. Application filed on Apr. 5, 2024: U.S. Application Ser. No. 18/628,460.

BACKGROUND

Technical Field

This disclosure relates generally to a computer processor and, more specifically, to specialized hardware for handling of certain instructions.

Description of the Related Art

Modern computer systems often include processors that are integrated onto a chip with other computer components, such as memories or communication interfaces. During operation, the processors execute instructions to implement various software routines, such as user software applications and an operating system. As part of implementing a software routine, a processor normally executes various different types of instructions, such as instructions to generate values needed by the software routine. The specific set of instructions executed by a given processor is defined by the processor's instruction set architecture (ISA).

Certain data processing operations, such as vector or matrix operations, involve use of large operands. For example, the operands needed may be large compared to a value that can be carried by an instruction as an immediate value or that can be stored in a typical register used by a processor. One operation that may use large operands is an interleave operation. For example, some ISAs include a "zip" instruction that reads elements from two or more vectors stored in respective source registers and alternately writes elements from the source vectors into a destination register (or group of registers) such that elements of the input vectors are interleaved in the result. An ISA may also include an "unzip" or de-interleave instruction to reverse this process.

An ISA may include instructions suitable for generating large operands for operations that use them. For example, a lookup table instruction may use multiple index values from a packed source register, where each index value is mapped to a larger value in a lookup table. Execution of the lookup table instruction causes the larger values corresponding to the index bits to be obtained and written to one or more destination registers. As another example, a move instruction may move portions (such as rows or columns) of a storage array to multiple destination registers to form a large operand.

DETAILED DESCRIPTION

Figure 1:
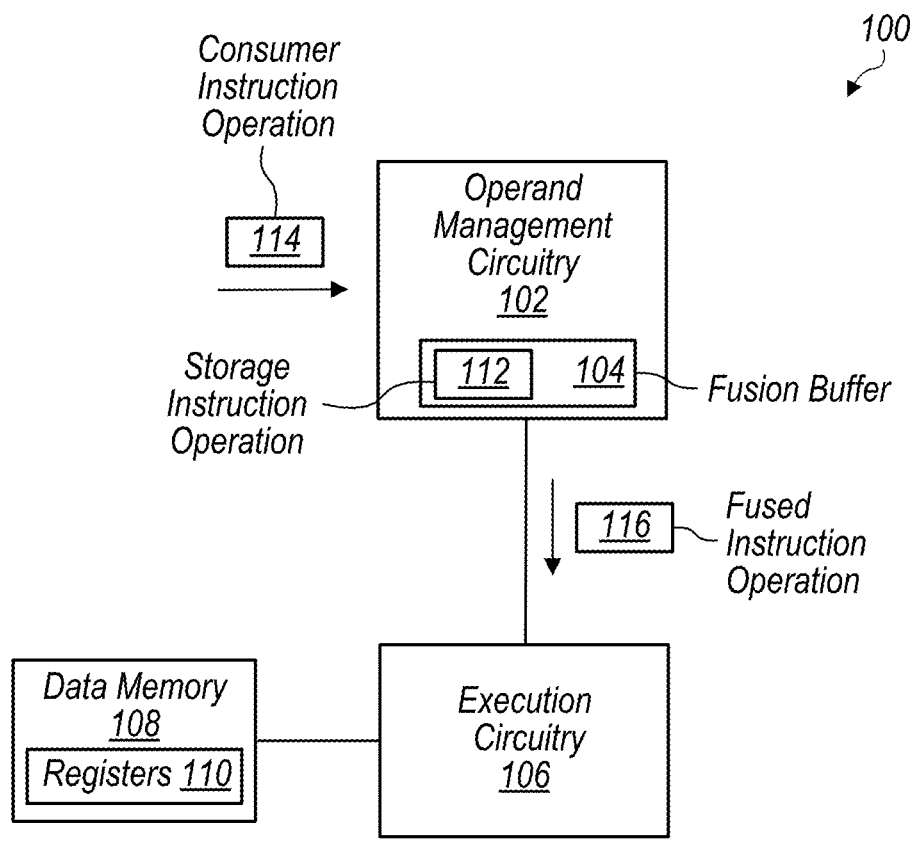
FIG. 1 is a block diagram illustrating example elements of a processor configured to manage operands using a fusion buffer, according to some embodiments.

As mentioned above, the set of instructions available to a programmer using a given processor is defined by the processor's instruction set architecture (ISA). There are a variety of instruction set architectures in existence (e.g., the x86 architecture originally developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. For a given ISA, there are often operations that programmers want to implement that do not correspond to a single instruction in the ISA. Such operations may therefore be implemented using two or more instructions.

Using a pair (or more) of instructions to implement an operation that could be done with one instruction can cause technical problems that reduce processor performance in multiple ways. As one example, execution of two instructions may increase the latency, or number of clock cycles required, to implement an operation. An increase in latency may particularly result if one or both of the two instructions implements a simple operation that can be done in a single cycle.

In addition to potentially increasing latency of a processor operation, using a pair of instructions rather than a single instruction can reduce performance by adding to traffic in the processor's instruction pipeline, potentially increasing power usage or congestion in elements such as the scheduler and reservation stations. Therefore, "fusing" a pair of instructions for execution as a single decoded instruction (or "instruction operation" as used herein) can reduce the amount of resources that would otherwise be consumed by processing those instructions separately. For example, an entry of a re-order buffer may be saved by storing one instead of two decoded instructions and an additional physical register may not need to be allocated. As another example, dispatch bandwidth, or a number of instruction operations dispatched to a reservation station per cycle, may be lowered by instruction fusion. In addition, issue bandwidth, or a number of instruction operations scheduled to an execution unit per cycle, may be lowered by fusion. More efficient and/or lower-power operation of the processor at multiple stages may therefore result from instruction fusion.

In the case of instructions for generating large operands, the ability to avoid writing the operands to registers can provide additional benefits beyond those provided by instruction fusion generally, particularly when the processor has a relatively low number of write ports. This may be the case in certain vector/matrix co-processors, for example. Depending on the specific instructions involved, there may be more than one consumer instruction needing to use operands stored by an operand storage instruction. One way to ensure that the operands are available for additional consumer instructions, even after fused execution with a first consumer instruction, would be to send the storage instruction for execution so that the destination registers of the first instruction are written with the operand(s). This could negate much of the benefit of fusing the instructions for execution in the first place, however, because of the time needed for writing to what may be multiple registers.

The present disclosure describes techniques for using a fusion buffer to reduce the need for writing to registers during execution of certain instructions for generating large operands.

In one embodiment, a fusion buffer is used to store a first storage instruction operation (decoded storage instruction) executable to write one or more operand values into one or more destination registers. Such storage of a storage instruction operation is illustrated in, for example, FIGS. 1, 6A-6B, 7A-7B, and 9-11. The first storage instruction operation may stay in the fusion buffer until a "buffer vacate condition" is detected, in response to which condition the first storage instruction operation is removed from the fusion buffer. Examples of buffer vacate conditions include a second storage instruction operation needing to be put into the fusion buffer or a need to dispatch the first storage instruction operation for execution to avoid instruction operations, or "ops," going out of order to the execution pipeline (e.g., reservation station or op queue) that the first storage instruction is assigned to. In an embodiment, a "drop condition" associated with the first storage instruction operation is checked for. A drop condition is a determination that there are no more consumer instructions for the first storage instruction. In an embodiment, detecting a drop condition includes using register mapping data to determine that no consumer ops are currently in the execution pipeline and determining that the destination registers of the first storage instruction are being overwritten so that no future consumer ops for the first storage instruction will arrive.

If a "drop condition" is detected by the time the first storage instruction operation is removed from the fusion buffer, the first storage instruction operation can be dropped rather than dispatched for execution, so that the destination registers for the first storage instruction operation are never written. Such dropping of a storage instruction operation removed from a fusion buffer is illustrated in, for example, FIGS. 7C and 10-11. In an embodiment, if no drop condition has been detected at the time the first storage instruction operation is removed from the fusion buffer, the first storage instruction operation is dispatched for execution. Such execution of a storage instruction operation removed from a fusion buffer is illustrated in, for example, FIGS. 8 and 10. If an eligible consumer instruction operation is detected while the first storage instruction operation is in the fusion buffer, the first storage instruction operation and the consumer instruction operation can be fused into fused instruction operations for execution in a way that does not write the operand values to the destination registers of the first storage instruction. Such fusion of a storage instruction operation and a consumer instruction operation is illustrated in, for example, FIGS. 1, 7B-7C and 11.

Use of a fusion buffer as disclosed herein allows the storage instruction to potentially be dropped without needing to write to destination registers the operand values the instruction is executable to generate. This can provide a significant performance improvement in, for example, write-port-limited processors handling large operands. The fusion buffer may allow storage instruction operations to be retained for fused execution when an eligible consumer instruction operation is not available in the same decode group but may arrive in a subsequent decode group. In the case of consumer instructions that do not overwrite the destination registers of the storage instruction, use of the fusion buffer may allow a storage instruction to be fused with multiple consumer instructions for execution, until a vacate condition causes the storage instruction operation to be removed from the fusion buffer.

In various embodiments, execution of fused instruction operations involves using specialized execution circuitry. One example of such circuitry is an interleave execution circuit, embodiments of which are described herein. As noted above, interleave and de-interleave operations may be specified by some ISA instructions. These operations can be useful in various applications, such as image processing applications in which pixels are represented by multiple values corresponding to different component colors. Execution using typical processor execution circuitry of interleave and de-interleave operations, especially those with larger numbers of input values, can involve execution of multiple micro-operations requiring significant time and occupying multiple registers.

The present disclosure describes an execution circuit configured to perform interleave and de-interleave operations.

In one embodiment, the execution circuit includes an array storage circuit and a control circuit. The array storage circuit is configured to store elements of an array having a plurality of rows and a plurality of columns. The control circuit is configured to receive multiple input vectors and write the multiple input vectors to the array storage circuit. In an embodiment, the input vectors are written to the array storage circuit such that elements of a given input vector are split among multiple columns of a given subset of the plurality of columns of the array. The input vectors are also written to the array storage circuit such that a given row of the plurality of rows includes interleaved elements of the multiple input vectors. The control circuit is further configured to output data corresponding to rows of the array to form one or more result values. Examples of such an embodiment are illustrated in, for example, FIGS. 2, 12A-12F, 14A-14B and 17.

In another embodiment, the execution includes an array storage circuit as described above and a control circuit, where the control circuit is configured to receive multiple input interleaved values and write the multiple input interleaved values to the array storage circuit. The input interleaved values are written such that elements of a given interleaved input value are split among multiple columns of a given subset of the plurality of columns of the array and a given row of the plurality of rows includes ordered elements of a vector. The control circuit is further configured to output data corresponding to rows of the array to form one or more vector result values. Examples of such an embodiment are illustrated in, for example, FIGS. 2, 13A-13F and 18.

Figure 15:
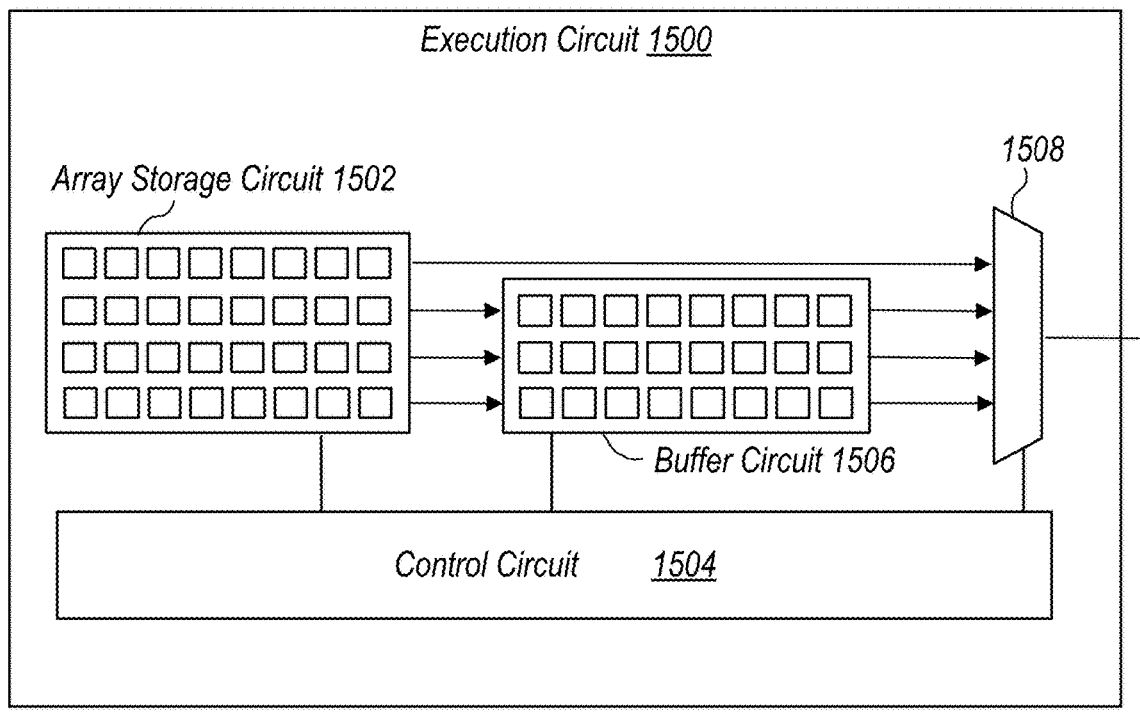
FIG. 15 is a block diagram illustrating example elements of an interleave execution circuit including a buffer circuit, according to some embodiments.
Figure 16:
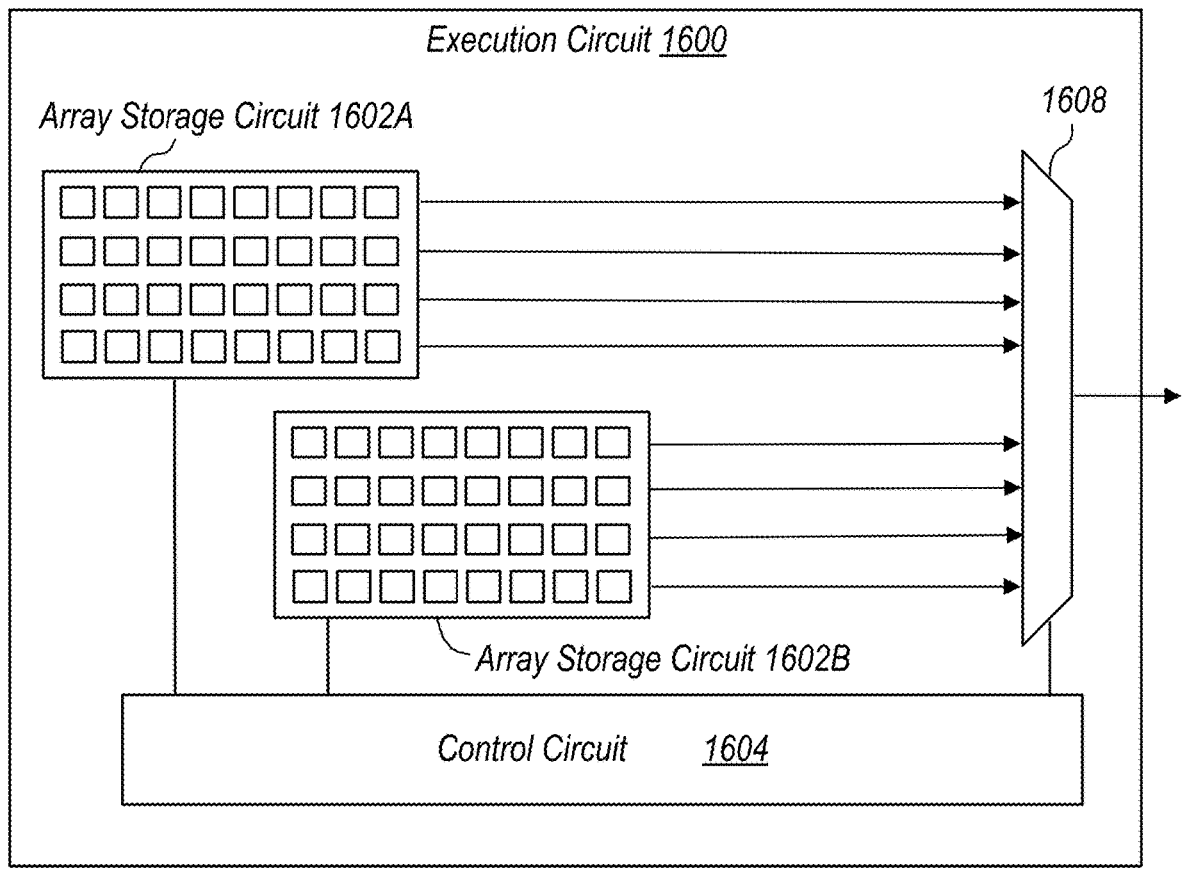
FIG. 16 is a block diagram illustrating example elements of an interleave execution circuit including two array storage circuits, according to some embodiments.

In an embodiment, the execution circuit includes storage circuitry configured to receive writing of values representing columns of an array and provide reading out of values corresponding to rows of the array. In various embodiments of operation of the execution circuit, elements of each input vector to be interleaved are split among columns of the array that are spaced apart by the number of input vectors. This spacing is illustrated in the examples of FIGS. 12A-12F and 14A-14B. In implementations having limited write ports, one way to avoid delays in execution is to use two array storage circuits within the execution circuit so that new input vectors can be written into the second array storage circuit as part of a second interleave (or de-interleave) operation while result values from a first interleave (or de-interleave) operation are being read out of the first array storage circuit. Such a configuration is illustrated in FIG. 16. Another example configuration includes a single array storage circuit combined with a side buffer configured to hold rows of the array storage circuit that cannot be written out to the destination of the interleave operation during the first cycle after the array storage circuit is filled. In an embodiment, the side buffer is configured to hold as many rows of the array storage circuit as there are not write ports available to select during the first cycle after the array storage circuit is filled. In such an embodiment, all data in the array storage circuit can be read out in one cycle (either through write ports to the intended destination or into the side buffer), with new input values being written to the array storage circuit in the following cycle as the side buffer is writing out the remainder of the result values. An example of this configuration is illustrated in FIG. 15.

Embodiments of the interleave execution circuitry as described herein may provide improved throughput for interleave and de-interleave operations as compared to execution by decoding into typically used micro-operations for interleaved reading from and writing to registers. Embodiments of the interleave execution circuitry can be used for executing single ISA interleave or de-interleave instructions or for fused execution of, for example, a move instruction with an interleave or de-interleave instruction.

FIG. 1 illustrates certain elements of a processor 100 configured to manage operands using a fusion buffer. As shown, processor 100 includes operand management circuitry 102 coupled to execution circuitry 106. Execution circuitry 106 is also coupled to data memory 108 which includes registers 110. Operand management circuitry 102 includes a fusion buffer 104 which is configured to store a storage instruction operation 112. Detection and storage of a storage instruction operation are further illustrated in FIGS. 6A and 6B. In an embodiment, storage instruction operation 112 is a decoded version of a storage instruction that is executable to store, into one or more destination registers among registers 110, one or more first operand values usable by one or more consumer instructions. Examples of storage instructions include lookup table instructions and move instructions, but other instruction types suitable for generating large operands can also be used with the circuits and methods described herein.

In various embodiments eligibility criteria may be established for determining whether a storage instruction operation is removed from the execution pipeline and stored into fusion buffer 104. In some embodiments, for example, only the youngest instruction operation in an execution pipeline is eligible to enter the fusion buffer. Certain specific instructions, such as particular lookup table or move instructions, may be designated as eligible in certain embodiments. Other criteria may also be implemented depending, for example, on timing constraints of the processor's execution pipeline.

Figure 9:
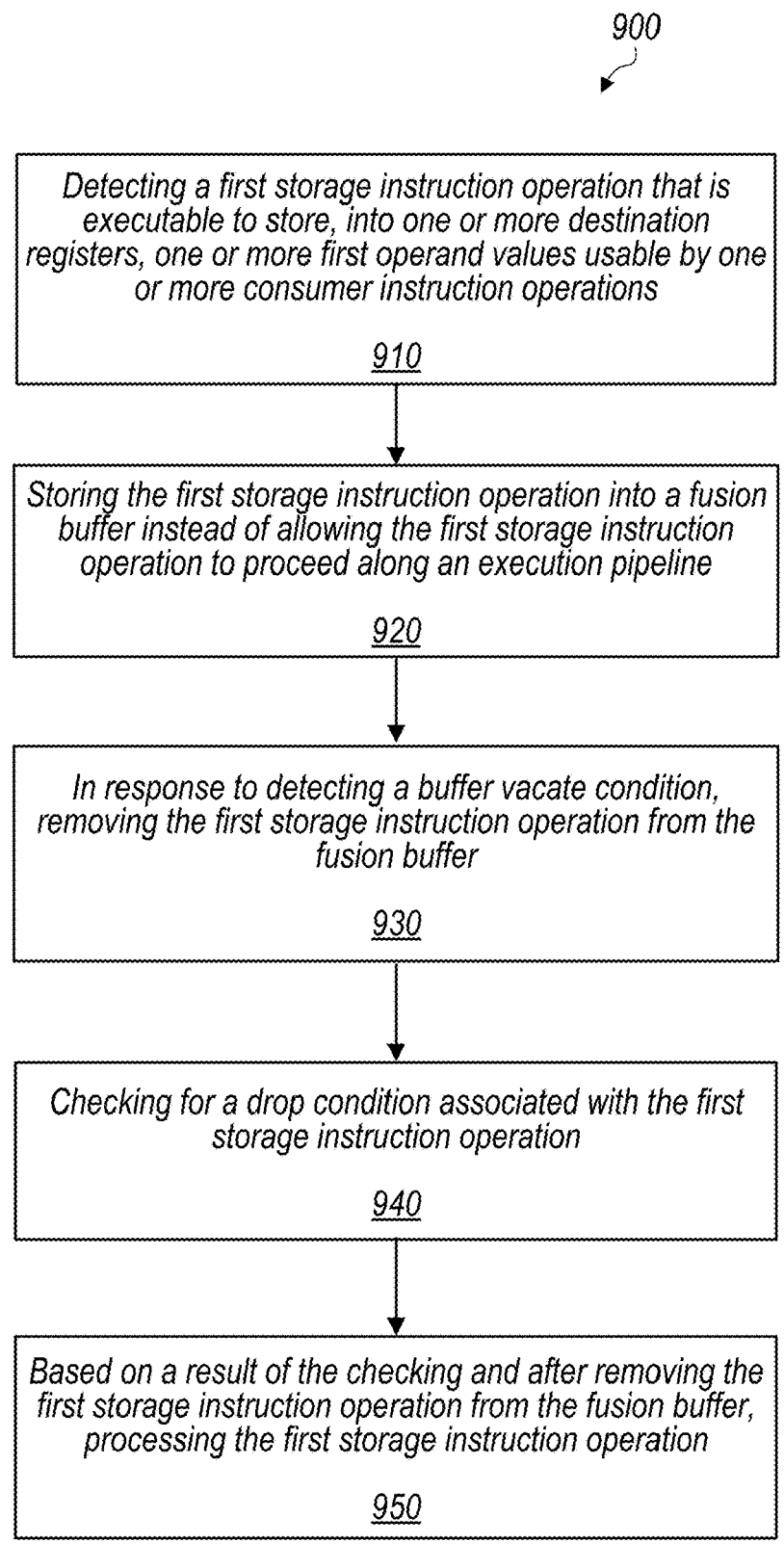
FIG. 9 is a flow diagram illustrating an example method relating to operand management using a fusion buffer, according to some embodiments.
Figure 10:
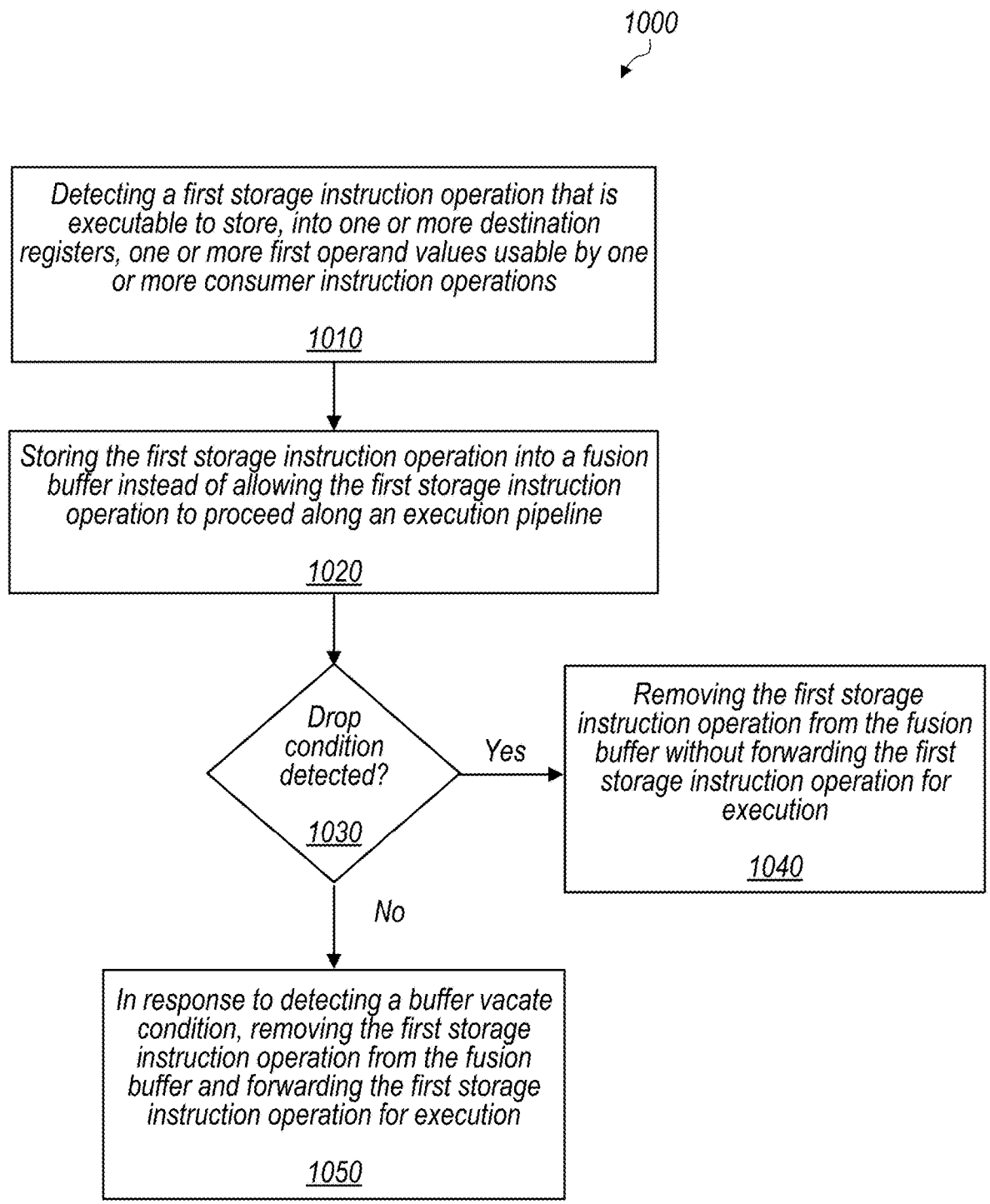
FIG. 10 is a flow diagram illustrating an example method relating to operand management using a fusion buffer, according to some embodiments.
Figure 11:
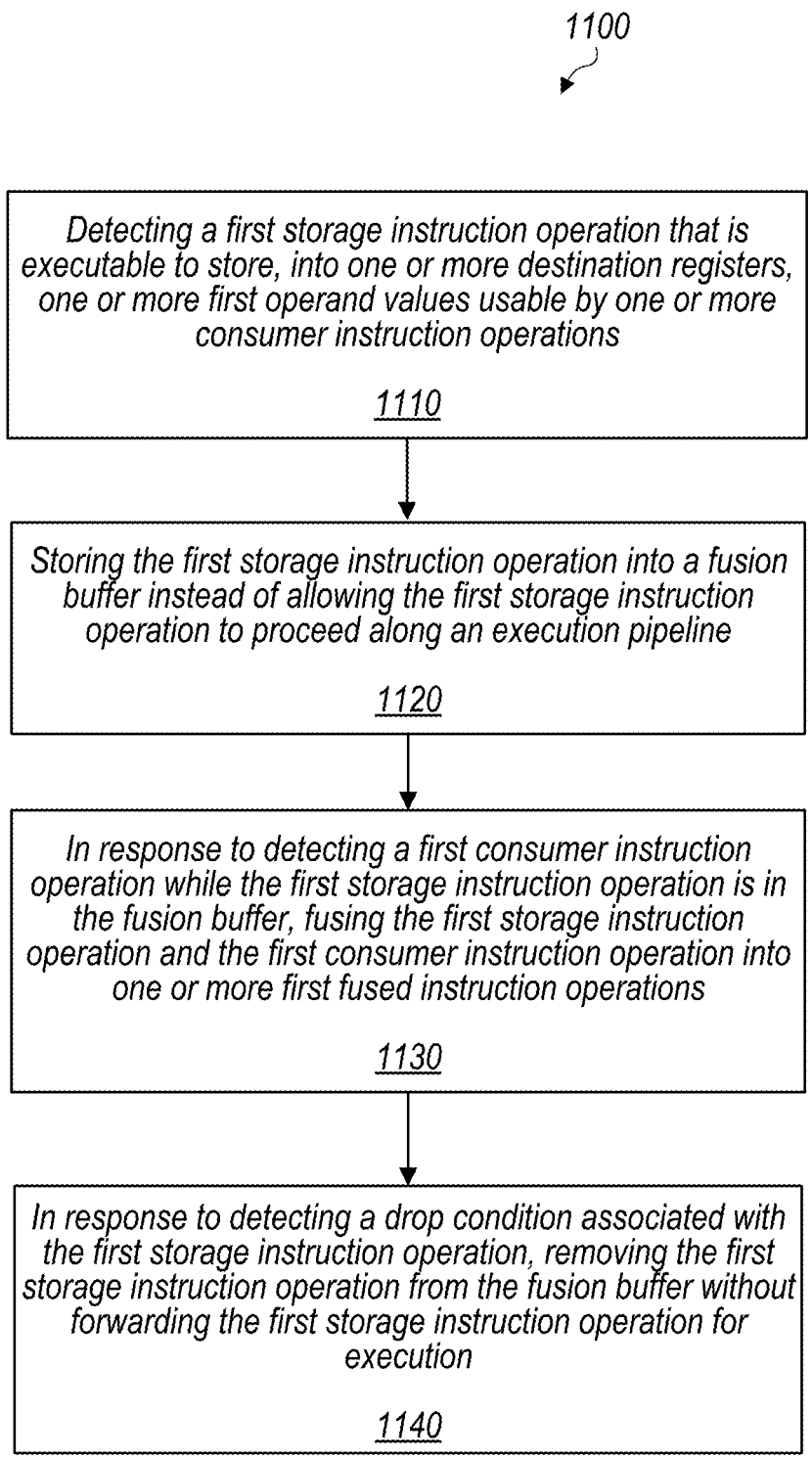
FIG. 11 is a flow diagram illustrating an example method relating to operand management using a fusion buffer, according to some embodiments.

In various embodiments, operand management circuitry 102 is configured to check for a drop condition associated with storage instruction operation 112. Such an embodiment is illustrated in FIG. 9. In response to detecting a drop condition, storage instruction operation 112 is dropped from the execution pipeline and not sent to execution circuitry 106. Embodiments of methods including detecting a drop condition are illustrated in FIGS. 10 and 11. Because storage instruction operation 112 is not executed in this scenario, operands are not written to registers 110. In some embodiments, detecting a drop condition includes a determination that no more consumer instruction operations for the operands generated by storage instruction operation 112 are in an instruction pipeline of the processor. This determination may be made using a mapper or other register mapping data structure. Detecting the drop condition may further include a determination that no consumer instruction operations for storage instruction operation 112 have yet to arrive. Such a determination could in some cases result from execution of a fused instruction operation 116 that combines the operations of storage instruction operation 112 with an incoming consumer instruction operation 114, in a case where execution of fused instruction operation 116 overwrites the destination registers specified by storage instruction operation 112. As another example, arrival of an additional storage instruction operation that specifies the same destination registers shows that the first storage instruction operation will not have additional consumer instruction operations. A scenario in which a fused instruction operation 116 is sent for execution while storage instruction operation 112 is dropped is illustrated in FIG. 7C.

Figure 8:
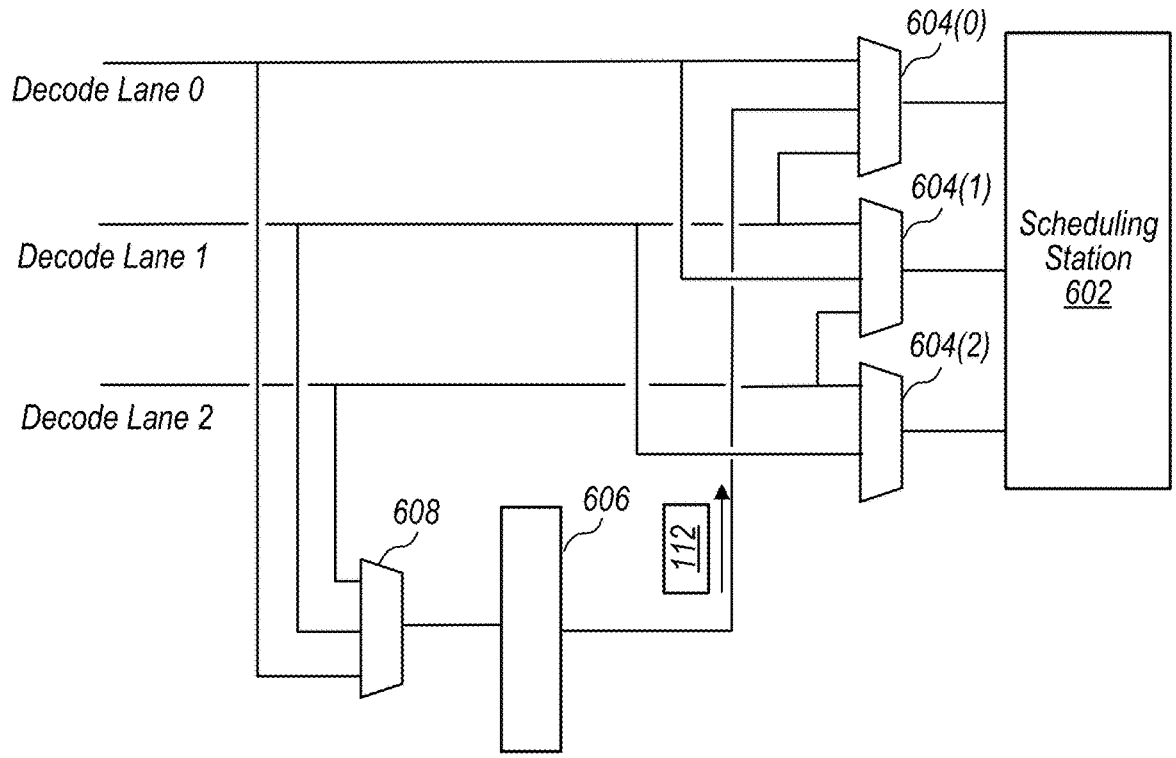
FIG. 8 is a block diagram illustrating removal from a fusion buffer and forwarding for execution of a storage instruction operation, according to some embodiments.

In various embodiments, storage instruction operation 112 may be retained in fusion buffer 104 until either a drop condition or a buffer vacate condition is detected. A buffer vacate condition is a condition requiring the storage instruction operation in the fusion buffer to be removed. As an example, arrival of an additional storage instruction operation that is eligible for storage in the fusion buffer constitutes a buffer vacate condition in some embodiments. Depending on the operation of the processor, arrival of an instruction operation assigned to the same execution pipeline as the buffered instruction operation may constitute a buffer vacate condition as well. Other examples of possible buffer vacate conditions include arrival of certain instructions that set or reset state in the processor or expiration of a time limit established for an instruction to stay in the fusion buffer. In an embodiment, if a buffer vacate condition is detected and a drop condition does not exist, storage instruction operation 112 is forwarded along the execution pipeline for execution. Such a scenario is illustrated in FIGS. 8 and 10. This execution will result in operand values being written to the destination registers specified by the storage instruction operation.

If an incoming consumer instruction operation 114 is detected while storage instruction operation 112 is in fusion buffer 104 and any other fusion eligibility requirements are met, storage instruction operation 112 and consumer instruction operation 114 are fused into fused instruction operation 116 for execution. An embodiment of a method including fusing a storage instruction operation and a consumer instruction operation for execution is illustrated in FIG. 11. In various embodiments, fusion eligibility requirements are implemented to promote proper production, by execution of a fused instruction operation, of the result specified by the original non-fused instructions. As an example, for some instruction pairs a fusion eligibility requirement is that source registers specified by the consumer instruction operation match destination registers specified by the storage instruction operation. Fusion eligibility requirements may also be implemented to reduce timing complexity in a processor's execution pipelines in some embodiments. For example, fusion eligibility may be limited to certain specific instructions or instruction types.

As an example, in an embodiment for which the storage instruction operation implements a lookup table operation such as one specified by an ARM LUTI instruction, eligible consumer instruction operations may include consumer instruction operations implementing matrix or grid-based operations in some embodiments. In an embodiment for which the storage instruction operation implements a move instruction from a storage array, such as an ARM MOVA instruction, eligible consumer instruction operations may include consumer instruction operations implementing shift and saturate operations in some embodiments. In other embodiments in which the storage instruction operation implements a move instruction from a storage array, eligible consumer instruction operations may implement interleave or de-interleave operations in some embodiments. The foregoing are merely examples and other eligible instruction combinations for fused execution may be implemented using the circuits and techniques disclosed herein.

In an embodiment, fused instruction operation 116 is executable to perform the operation specified by consumer instruction operation 114 using the operands specified by storage instruction operation 112. In a further embodiment, execution of fused instruction operation 116 does not include writing the operands to the destination registers specified by storage instruction operation 112, and then reading them back out again, as would occur during separate execution of instruction operations 112 and 114. If storage instruction operation 112 is a lookup table operation, for example, fused instruction operation 116 is executable in such an embodiment to obtain the operands from the lookup table and perform the operation specified by consumer instruction operation 114 using the obtained operands. If storage instruction operation 112 is a move instruction for moving specified portions of a stored array to registers, fused instruction operation 116 is executable in such an embodiment to obtain the operands from the stored array and perform the operation.

In some embodiments, execution of fused instruction operation 116 results in overwriting of the destination registers specified by storage instruction operation 112. This results in a drop condition allowing storage instruction operation 112 to be removed from fusion buffer 104 and dropped without further execution. In other embodiments, execution of fused instruction operation 116 does not overwrite the destination registers for storage instruction operation 112. In such an embodiment, storage instruction operation 112 may be left in fusion buffer 104 for possible fusion with additional consumer instruction operations that specify the operands generated by storage instruction operation 112. Such a scenario is illustrated in FIG. 7B. In other embodiments, a buffer vacate condition may be set such that only one fused execution is allowed for a given storage instruction operation. In such a case, storage instruction operation 112 would be removed from the buffer and either dropped (if a drop condition is met) or forwarded for execution.

Processor 100 of FIG. 1 can take various forms. For example, the circuitry and methods described herein could be implemented by a coprocessor such as that illustrated in FIGS. 3 and 4, or by a core processor as illustrated in FIG. 5. In an embodiment, processor 100 is a non-speculative processor.

Figure 2:
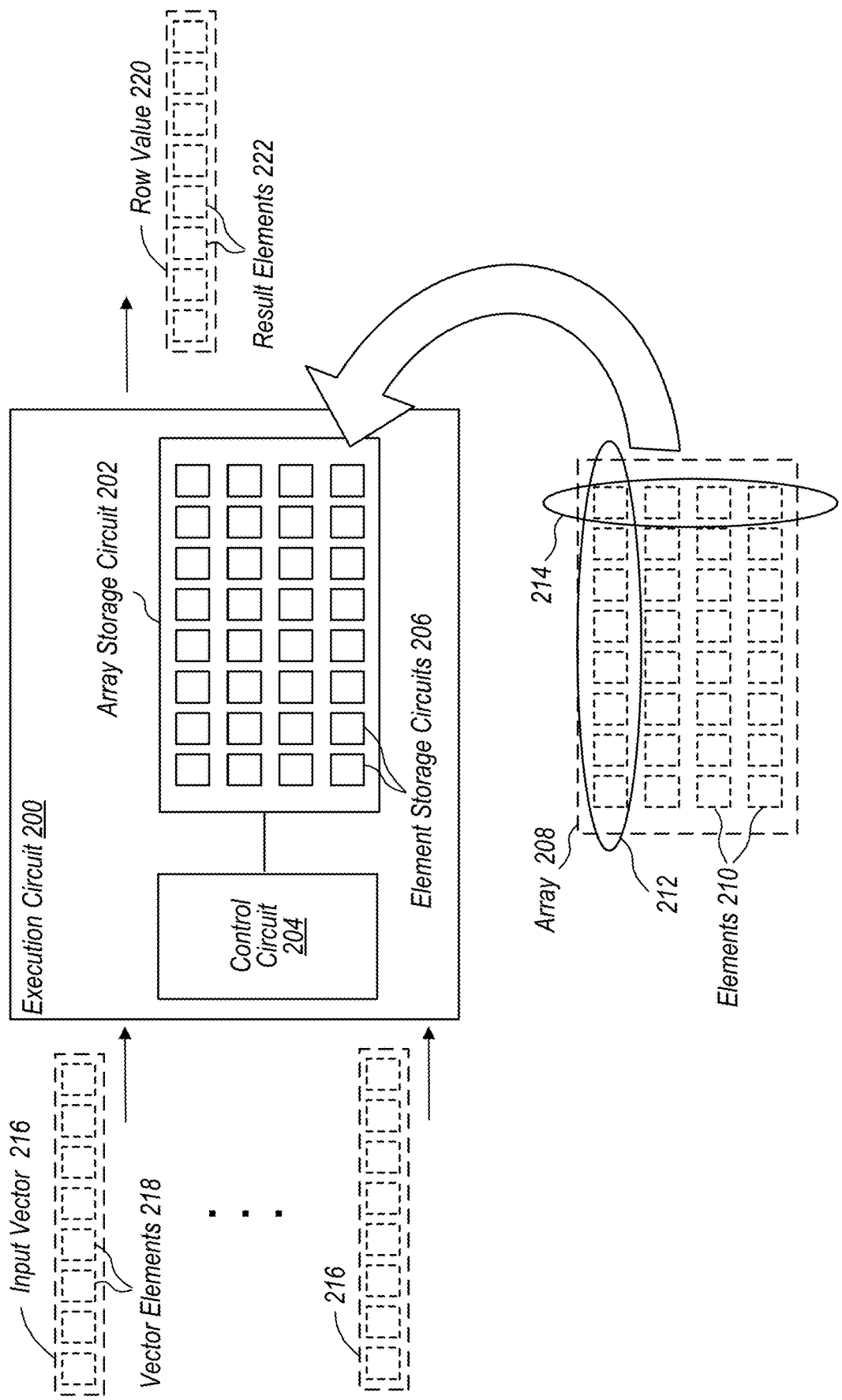
FIG. 2 is a block diagram illustrating example elements of an interleave execution circuit, according to some embodiments.

FIG. 2 is a block diagram illustrating an execution circuit 200 configured to perform interleave and de-interleave operations. In various embodiments, execution circuit 200 is included in execution circuitry such as circuitry 106 of FIG. 1 or execution circuits 318, 418 and 540 of FIGS. 3, 4 and 5, respectively. Execution circuit 200 may also be referred to herein as an "interleave execution circuit" or "interleave/de-interleave execution circuit." In various embodiments, execution circuit 200 and other interleave execution circuit embodiments described herein may be used for execution of interleave or de-interleave operations corresponding to single ISA instructions such as, for example, the ARM ZIP or UZP instructions or interleaving load and store operations such as the ARM LD4 or ST4 instructions. Interleave execution circuits as described herein may also be used for execution of fused instruction operations combining a storage instruction operation that is executable to generate operands, as described in this disclosure, with a consumer instruction executable to use the generated operands to perform an interleave or de-interleave operation.

As shown in FIG. 2, execution circuit 200 includes an array storage circuit 202 coupled to a control circuit 204. Array storage circuit 202 includes element storage circuits 206, which are configured to store elements 210 of an array 208 having rows 212 and columns 214 (examples of which are circled in FIG. 2). Although array storage circuit 202 is shown as having element storage circuits 206 arranged in a two-dimensional array of the same dimensions as array 208, array storage circuit 202 can be configured differently in various embodiments. For example, array storage circuit 202 may in some embodiments include more element storage circuits 206 than are needed to store elements of a given array such as array 208. Array storage circuit 202 may also include elements arranged in something other than a two-dimensional array, such as a three-dimensional arrangement or a one-dimensional arrangement along a single line. However element storage circuits 206 may be arranged physically within array storage circuit 202, circuit 202 is connected such that elements 210 may be written or read in relation to their positions in array 208 (such as by rows or columns of array 208). In FIG. 2 solid lines are used to depict hardware such as circuits while dashed lines are used to depict data stored or operated on by the hardware. As used herein, storage of data into an array such as array 208 is to be understood as also storing the data into corresponding element storage circuits of an array storage circuit such as circuit 202.

In an embodiment, control circuit 204 is configured to receive multiple input vectors such as input vectors 216.

Each vector 216 includes multiple vector elements 218. Receiving the input vectors may include reading the input vectors from registers or other storage. In embodiments in which execution circuit 200 is used to execute fused instruction operations, the input vectors may be operands obtained from locations specified by a storage instruction being fused with an interleave instruction. For example, the input vectors may be obtained from a lookup table or a stored array. Control circuit 204 is further configured, in some embodiments, to write the multiple input vectors 216 to array storage circuit 202 such that elements of a given input vector are split among multiple columns of a given subset of the plurality of columns 214 within array 208. An example of such splitting of input vector elements among multiple columns of a subset is shown in, for example, FIGS. 12B-12E and 14A-14B. In some embodiments, control circuit 204 is further configured to write the multiple input vectors 216 to the array storage circuit 202 such that a given row 212 of the plurality of rows in array 208 contains interleaved elements of the multiple input vectors. An example of such rows having interleaved elements of the multiple input vectors is illustrated in, for example, FIGS. 12E-12F and 14B.

Figure 17:
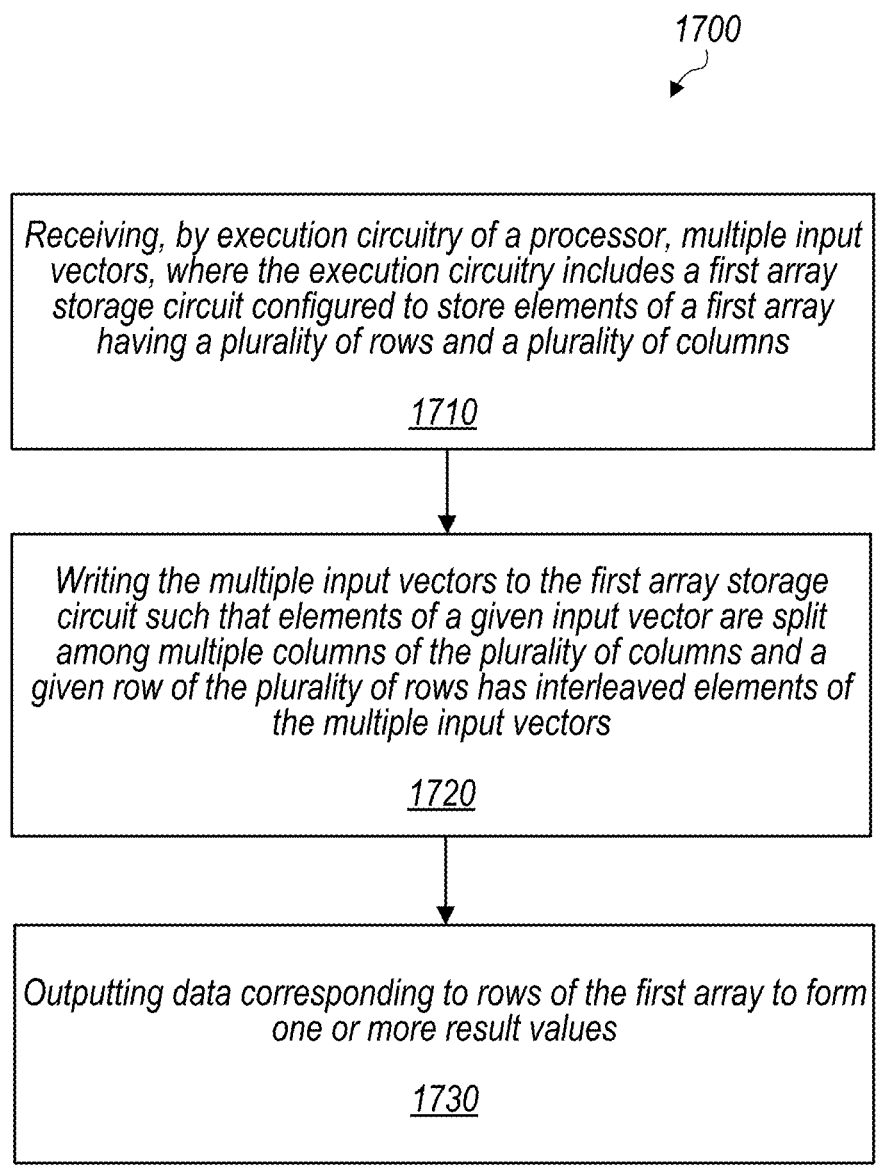
FIG. 17 is a flow diagram illustrating an example method relating to an interleave process using an interleave execution circuit, according to some embodiments.

The control circuit is further configured to output from array storage circuit 202 data corresponding to rows 212 of array 208, in the form of row values 220. Row values 220 include result elements 222. Result elements 222 are elements 210 of array 208 and reflect vector elements 218 that have been rearranged (as compared to their arrangement in input vectors 216) by virtue of the manner in which they were written into and read out of array storage circuit 202. In various embodiments, row values 220 may form individual result values or be concatenated into one or more longer result values. An embodiment of a method of interleaving input vectors using execution circuitry such as circuit 200 is illustrated in FIG. 17.

Figure 13A:
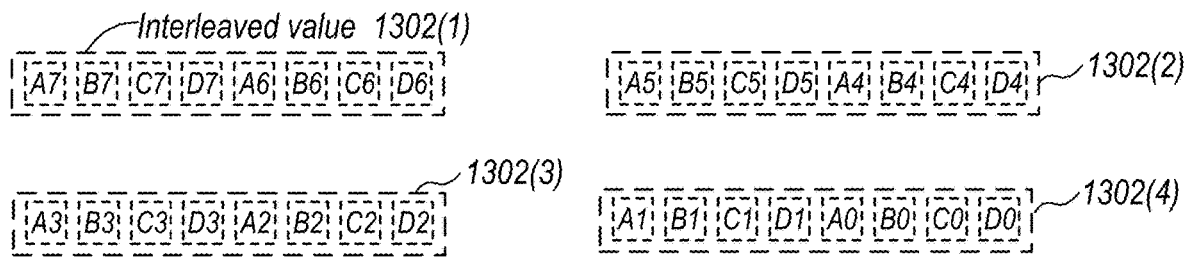
FIG. 13A is a block diagram illustrating example interleaved values received by an interleave execution circuit performing a de-interleave operation, according to some embodiments.
Figure 18:
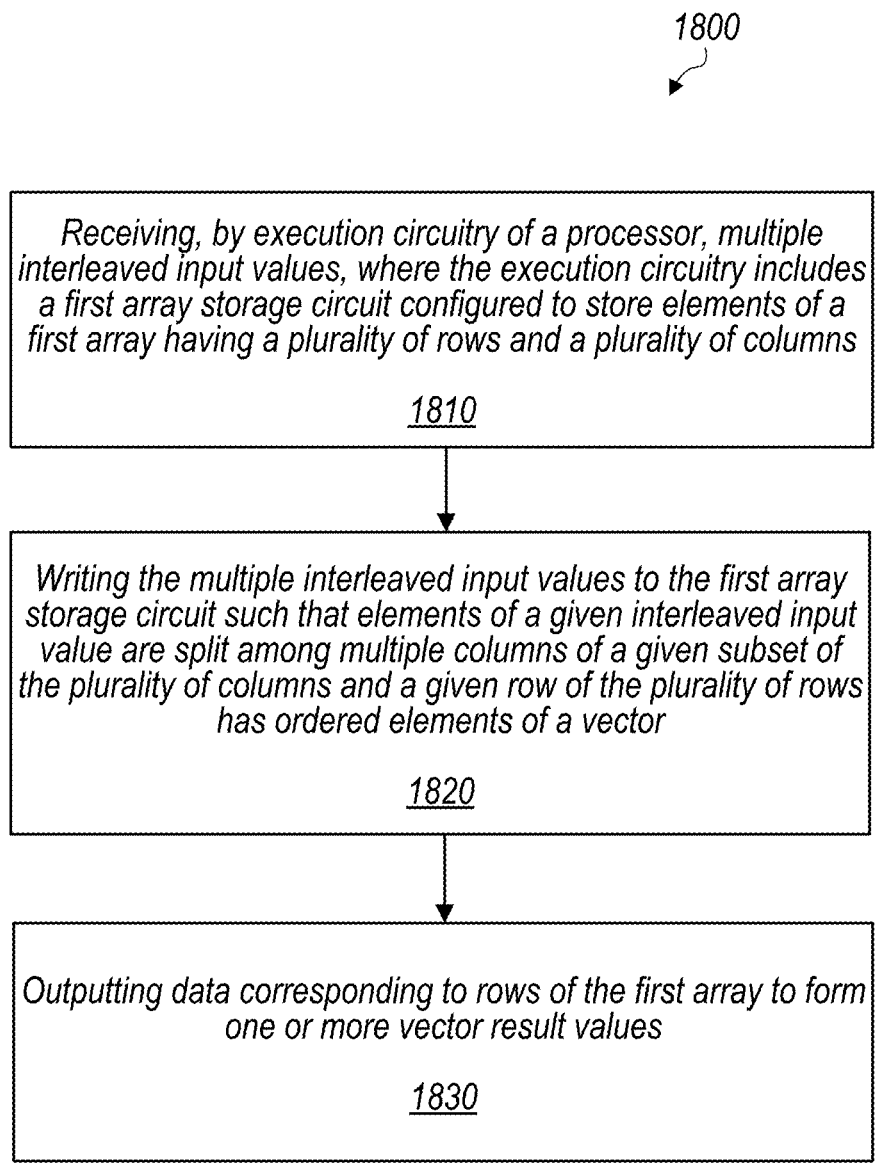
FIG. 18 is a flow diagram illustrating an example method relating to a de-interleave process using an interleave execution circuit, according to some embodiments.

In another embodiment, control circuit 204 is configured to receive multiple interleaved input values such as values 1302 of FIG. 13A rather than input vectors 216. Instead of elements 218 of a given vector, elements of interleaved input values 1302 are interleaved elements of multiple vectors. Control circuit 204 is further configured, in some embodiments, to write the multiple interleaved input values to array storage circuit 202 such that elements of a given interleaved value are split among multiple columns of a given subset of the plurality of columns 214 within array 208. An example of such splitting of interleaved input value elements among multiple columns of a subset is shown in, for example, FIGS. 13B-13E. In some embodiments, control circuit 204 is further configured to write the multiple interleaved input values to the array storage circuit such that a given row 212 of the plurality of rows in array 208 has ordered elements of a vector. An example of such rows having ordered vector elements is illustrated in, for example, FIGS. 13E-13F. The control circuit is further configured to output from array storage circuit 202 data corresponding to rows 212 of array 208 to form one or more result values. An embodiment of a method of de-interleaving input vectors using execution circuitry such as circuit 200 is illustrated in FIG. 18.

Figure 3:
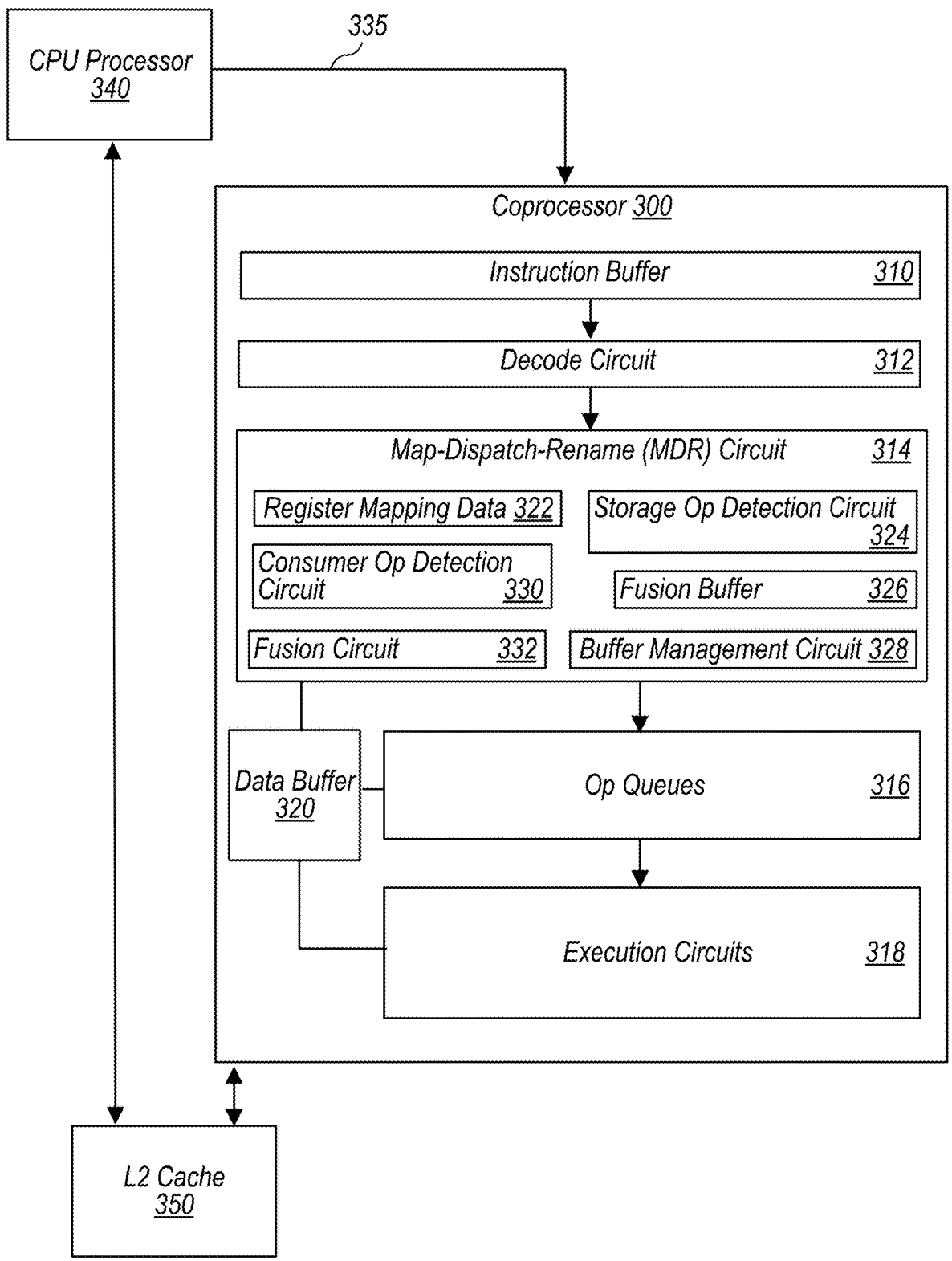
FIG. 3 is a block diagram illustrating example elements of a coprocessor configured to manage operands using a fusion buffer, according to some embodiments.

Returning to the operand management circuitry discussed above, FIGS. 3, 4 and 5 illustrate example elements of processors configured to manage operands using a fusion buffer. FIG. 3 illustrates an apparatus including a CPU processor 340, a coprocessor 300 and a level two (L2) cache 350. Coprocessor 300 is an example of an implementation of processor 100 of FIG. 1. In some embodiments, coprocessor 300 may be coupled to a data cache (DCache, not shown) in CPU processor 340 instead of or in addition to L2 cache 350. Coprocessor 300 is configured to receive instructions from, and provide results to, a CPU processor 340. In an embodiment, coprocessor 300 is a coprocessor for performing vector and matrix operations. Coprocessor 300 includes an instruction buffer 310, decode circuit 312, map-dispatch-rename (MDR) circuit 314, op queues 316, a data buffer 320 and execution circuits 318. In various embodiments, circuits within MDR circuit 314 implement operand management circuitry such as circuitry 102 of FIG. 1. Execution circuits 318, in combination with op queues 316 in some embodiments, implement execution circuitry such as circuitry 106 of FIG. 1. In various embodiments data buffer 320 implements a data memory such as data memory 108 of FIG. 1.

In various embodiments, coprocessor 300 is configured to perform one or more computation operations and/or one or more coprocessor load/store operations. Coprocessor 300 may employ an instruction set, which may in some embodiments include a subset of an instruction set implemented by CPU processor 340 or may include instructions not implemented by the CPU processor. In an embodiment, CPU processor 340 recognizes instructions implemented by coprocessor 300 and communicates those instructions to the coprocessor. Any mechanism for transporting the coprocessor instructions from CPU processor 340 to coprocessor 300 may be used. For example, FIG. 1 illustrates a communication path 335 between the CPU processor 340 and the coprocessor 300. The path may be a dedicated communication path, for example if the coprocessor 300 is physically located near the CPU processor 340. The communication path may also be shared with other communications. For example, a packet-based communication system can be used in some embodiments to transmit memory requests to the system memory and instructions to the coprocessor 300. In an embodiment, instructions may be bundled and transmitted to the coprocessor 300. In one particular embodiment, coprocessor instructions may be communicated through the L2 cache 350 to the coprocessor 300. For example, cache operations, cache evictions, etc. may be transmitted by CPU processor 340 to the L2 cache 350, and thus there may be an interface to transmit an operation and a cache line of data. The same interface may be used, in an embodiment, to transmit a bundle of instructions to the coprocessor 300 through the L2 cache 350.

In an embodiment, coprocessor 300 may support various data types and data sizes (or precisions). For example, floating point and integer data types may be supported. In various embodiments, a floating-point data type includes 16-bit, 32-bit, and/or 64-bit precisions. Integer data types may include 8-bit and 16-bit precisions in various embodiments, and both signed and unsigned integers may be supported. Other embodiments may include a subset of the above precisions, additional precisions, or a subset of the above precisions and additional precisions (e.g. larger or smaller precisions). In an embodiment, 8-bit and 16-bit precisions may be supported on input operands, and 32-bit accumulations may be supported for the results of operating on those operands.

In various embodiments, coprocessor 300 is configured to receive instructions from CPU processor 340 into instruction buffer 310. Decode circuit 312 decodes the received instructions into one or more instruction operations (ops) for execution. In various embodiments decode circuit 312 may implement decode and pre-decode stages of a front end of coprocessor 300. The decoded ops may include, for example, compute ops that are executed using execution circuits 318 as well as memory ops for reading data from memory into data buffer 320 and storing data from data buffer 320 to memory (via L2 cache 350). In an embodiment, compute ops include ops using vector operands stored in data buffer 320. In a further embodiment execution circuits 318 include a grid execution circuit having memory distributed among elements of the grid execution circuit for storing results of operations using the vector operands. Execution circuits 318 may also include other types of execution circuit in various embodiments, such as interleave/de-interleave execution circuitry described herein.

In an embodiment, coprocessor load operations for coprocessor 300 may transfer vectors from a system memory (not shown in FIG. 3) to data buffer 320 or to memory within execution circuits 318. Coprocessor store operations may in some embodiments write vectors to system memory from data buffer 320 or from memory within execution circuits 318. The system memory may be formed from a random access memory (RAM) such as various types of dynamic RAM (DRAM) or static RAM (SRAM). A memory controller may be included to interface to the system memory. In one embodiment, coprocessor 300 is cache coherent with CPU processor 340. In another embodiment, coprocessor 300 has access to L2 cache 350, and L2 cache 350 ensures cache coherency with caches of CPU processor 340. In yet another embodiment, coprocessor 300 may have access to the memory system, and a coherence point in the memory system may ensure the coherency of the accesses. As another alternative, coprocessor 300 may have access to the CPU caches. In still another embodiment, coprocessor 300 may have one or more caches (which may be virtually addressed or physically addressed, as desired). The coprocessor caches may be used if an L2 cache 350 is not provided and access to the CPU caches is not provided. Alternatively, coprocessor 300 may have caches and access to the L2 cache 350 for misses in those caches. Any mechanism for accessing memory and ensuring coherency may be used in various embodiments.

CPU processor 340 may be responsible for fetching the instructions executed by CPU processor 340 and coprocessor 300, in an embodiment. In an embodiment, the coprocessor instructions may be issued by CPU processor 340 to coprocessor 300 when they are no longer speculative. Generally, an instruction or operation may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in CPU processor 340 and the instruction itself is also known not to cause an exception/speculative flush. Some instructions may be known not to cause exceptions based on the instruction set architecture implemented by CPU processor 340 and may also not cause speculative flushes. Once the other prior instructions have been determined to be exception-free and flush-free, such instructions are also exception-free and flush-free.

Instruction buffer 310 may allow coprocessor 300 to queue instructions while other instructions are being performed. In one embodiment, instruction buffer 310 is a first in, first out buffer (FIFO). That is, instructions are processed in program order in such an embodiment. Other embodiments may implement other types of buffers, multiple buffers for different types of instructions (e.g. load/store instructions versus compute instructions) and/or may permit out of order processing of instructions.

In an embodiment, decoding by decode circuit 312 includes extracting architectural source and destination register information from the received instructions. In a further embodiment, map-dispatch-rename (MDR) circuit 314 maps the architectural registers to physical registers and passes ops to op queues 316 for execution. In various embodiments, MDR circuit 314 implements instruction mapping and dispatch stages of a front end of coprocessor 300. Op queues 316 ensure that needed operands are ready and forward ops for execution. In an embodiment, op queues 316 are implemented using reservation stations.

In the embodiment of FIG. 3, MDR circuit 314 includes register mapping data 322, storage op detection circuit 324, fusion buffer 326, buffer management circuit 328, consumer op detection circuit 330 and fusion circuit 332. Register mapping data 322 includes one or more data structures used in tracking register information such as assignments of architectural to physical registers or consumer ops for a given register. In various embodiments, register mapping data 322 may include, for example, register lists indicating physical register availability, mapper data indicating which physical registers are mapped to which architectural registers, and/or count data indicating a number of ops consuming data from a given architectural register. In various embodiments, register mapping data 322 may be stored in one or more content-addressable memories (CAMs).

Storage op detection circuit 324 is configured to identify, from among the decoded ops, storage ops eligible for placement into fusion buffer 326. In an embodiment, certain storage ops executable to write large operands to destination registers are designated as eligible for placement into the fusion buffer. For example, a lookup table instruction operation, such as a decoded LUTI instruction in the ARM ISA, may be eligible for placement into fusion buffer 326. In a further embodiment, a LUTI instruction operation having a larger number of destinations, such as two or four destinations, may be eligible for placement into the fusion buffer. As another example, a move instruction operation, such as a decoded MOVA instruction in the ARM ISA, may be eligible for placement into fusion buffer 326.

In some embodiments, more instruction operations are eligible for immediate fused execution with an available consumer instruction operation than are eligible for placement into the fusion buffer. For example, a single-destination MOVA instruction operation may be eligible in some embodiments for fusion with an instruction operation appearing in the same decode group for a matrix operation using the destination values of the MOVA instruction operation. If such a single-destination MOVA instruction operation appears without an available consumer instruction for fusion, however, it may not be eligible for placement into fusion buffer 326 to await a possible subsequent consumer instruction. In some embodiments, placement into fusion buffer 326 may be limited to storage instruction operations configured to generate multiple operands or larger operands. Determination of eligibility for placement into fusion buffer 326 may involve other considerations in various embodiments, such as availability of execution circuitry needed for execution of particular fused instruction operations. In an embodiment, if multiple eligible instruction operations arrive in the same decode group, the younger (later in program order) of the eligible instruction operations is placed into fusion buffer 326. In some embodiments, only certain instructions within a decode group, such as the youngest instruction, are considered for placement into the fusion buffer.

In an embodiment, fusion buffer 326 is a single-entry buffer configured to store a single storage instruction operation. Fusion buffer 326 is connected so that a storage instruction operation can be stored in buffer 326 before reaching op queues 316. An op placed into the fusion buffer is taken out of the normal execution process for at least the time it remains in the fusion buffer. Placement of the op into the buffer provides a possibility that the op is executed only as a fused op, so that writing to destination registers of operands of operands associated with the op is avoided.

Buffer management circuit 328 is configured to determine whether an instruction operation is to be removed from fusion buffer 326, and whether a removed instruction operation is dropped or forwarded for execution. A condition causing an instruction operation to be removed from fusion buffer 326 is also referred to as a "vacate" or "buffer vacate" condition herein. As described in connection with FIG. 1 above, various events may be defined as vacate conditions, including arrival of another storage instruction operation that is to be stored in the fusion buffer. In some embodiments, vacate conditions result from events that make it more difficult or otherwise undesirable to maintain management of a particular instruction operation in fusion buffer 326, such as arrival of certain system instruction operations or of instruction operations assigned to the same execution pipeline as the buffered instruction operation. As another example, a vacate condition may be a result of a time limit being exceeded. In some embodiments, a vacate condition may be defined to remove an instruction operation from fusion buffer 326 when a single fused execution with an eligible consumer instruction operation has been performed (in other words, to not keep the instruction operation in the buffer in hopes of fused execution with additional consumer instruction operations).

In an embodiment, buffer management circuit 328 is configured to determine, when a buffer vacate condition occurs for a given buffered instruction operation, whether the instruction operation can be dropped rather than sent into its corresponding execution pipeline. For example, the instruction operation can be dropped if it is determined that there is no current or future consumer instruction operation that will need a result from the buffered instruction operation. In an embodiment, detection of a drop condition includes checking data within register mapping data 322. For example, checking for a buffer drop condition can include checking a data structure that tracks how many consumer instruction operations for a destination register of the buffered instruction operation are in an execution pipeline of the processor. In an embodiment, this data structure is physical register table in a CAM. A count of zero consumer instructions in such a data structure may indicate that there are no existing consumer instruction operations for the buffered instruction operation in an execution pipeline of the processor. Checking for a buffer drop condition can also include checking mapper data to see if the destination registers of the buffered instruction operation are being used by a different instruction. If so, there will be no future consumer instruction operations for the buffered instruction operation. In an embodiment, checking the mapper data includes checking an architectural register table in a CAM for destination physical registers of the buffered instruction operation. In various embodiments, if no existing or future consumer instruction operations are detected for the buffered (or previously buffered and newly vacated) instruction operation, the instruction operation can be dropped rather than forwarded for execution upon removal from fusion buffer 326.

Consumer op detection circuit 330 is configured to identify consumer instruction operations eligible for fused execution with a storage instruction operation stored in fusion buffer 326. In various embodiments, consumer op detection circuit 330 may implement various fusion eligibility requirements, such as those discussed in connection with FIG. 1 above. For example, one eligibility requirement may be that source registers specified by the consumer instruction operation match destination registers of the buffered storage instruction operation. Particular consumer instruction operations may be designated as eligible for fusion with particular buffered storage instruction operations. Fusion circuit 332 is configured to combine an eligible consumer instruction operation detected by consumer op detection circuit 330 with the storage instruction operation in fusion buffer 326 to form a fused instruction operation such as fused instruction operation 116 of FIG. 1. The fused instruction operation is executable to obtain the operand or operands that the buffered storage instruction operation is executable to generate and use the operand(s) to carry out the operation that the eligible consumer instruction operation is executable to perform. In an embodiment, execution of the fused instruction operation does not involve writing of the operand(s) to the destination register(s) of the buffered storage instruction operation. Execution of the fused instruction operation may in some embodiments involve use of specialized execution circuitry within execution circuits 318. In some embodiments, the buffered storage instruction operation is left in fusion buffer 326 for possible fusion with an additional eligible consumer instruction operation.

In some embodiments, detection of an eligible consumer instruction operation for fusion implements any relevant criteria for determining whether the fusion should be implemented, such as circuit timing considerations or availability of execution circuitry, so that consumer instruction operations determined to be eligible for fusion are fused for execution with the buffered storage instruction operation. In other embodiments, determination of eligibility for fusion and of whether fusion is implemented in a given case are separate determinations. For example, in some embodiments consumer op detection circuit may detect eligible consumer instruction operations for fusion with a buffered storage instruction operation, while fusion circuit 332 determines whether the fusion is to be implemented. Example elements of coprocessor 300 are illustrated in FIG. 3, and multiple other elements may be included which are not shown. In various embodiments, for example, coprocessor 300 may include detection circuitry and fusion circuitry for additional fused instruction execution not involving fusion buffer 326, such as fused execution of suitable pairs of non-buffered instruction operations. Such detection and fusion circuitry may be included within the detection and fusion circuits shown in FIG. 3 or in separate circuitry not shown.

Figure 4:
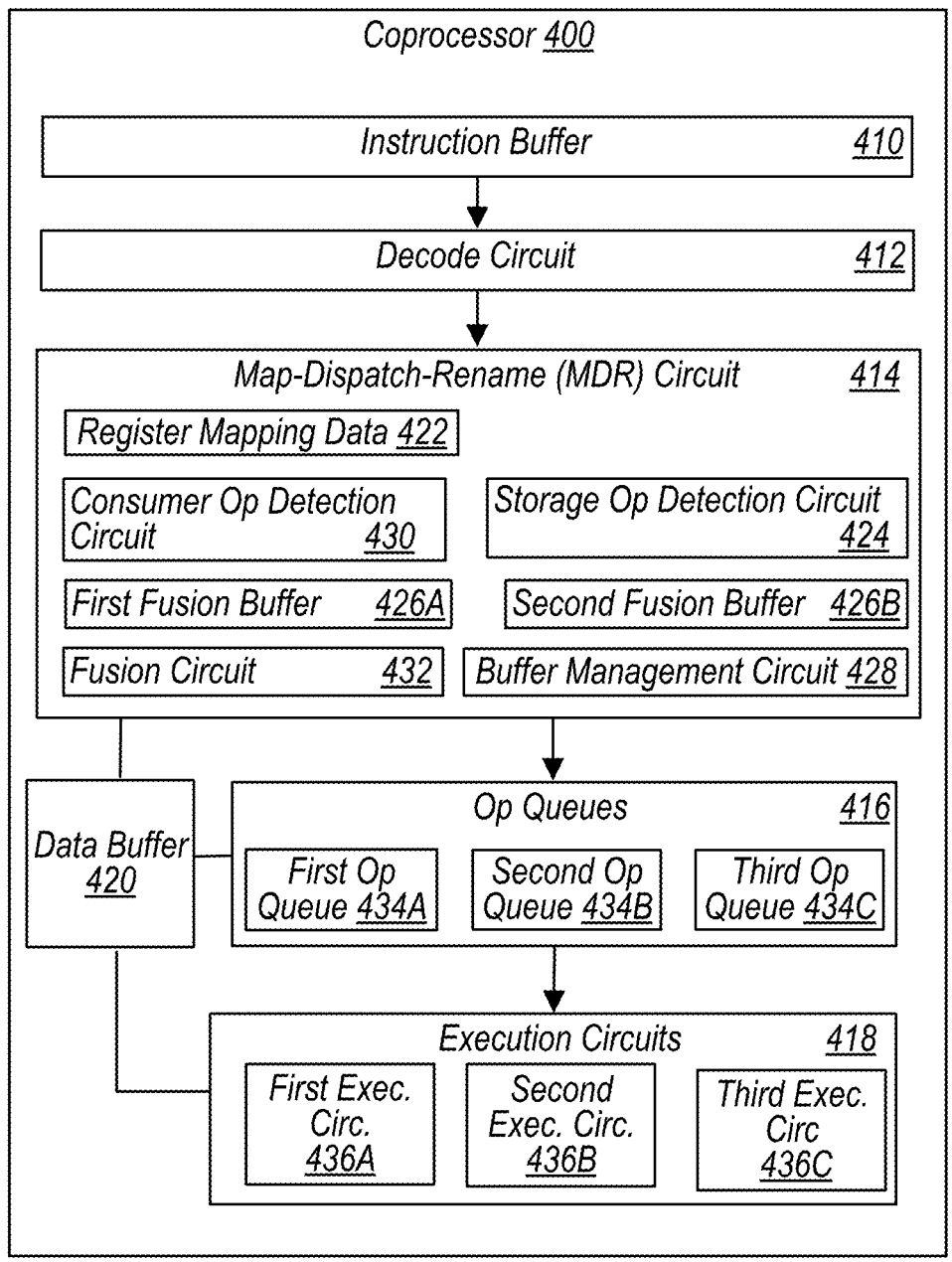
FIG. 4 is a block diagram illustrating example elements of a coprocessor configured to manage operands using multiple fusion buffers, according to some embodiments.
Figure 5:
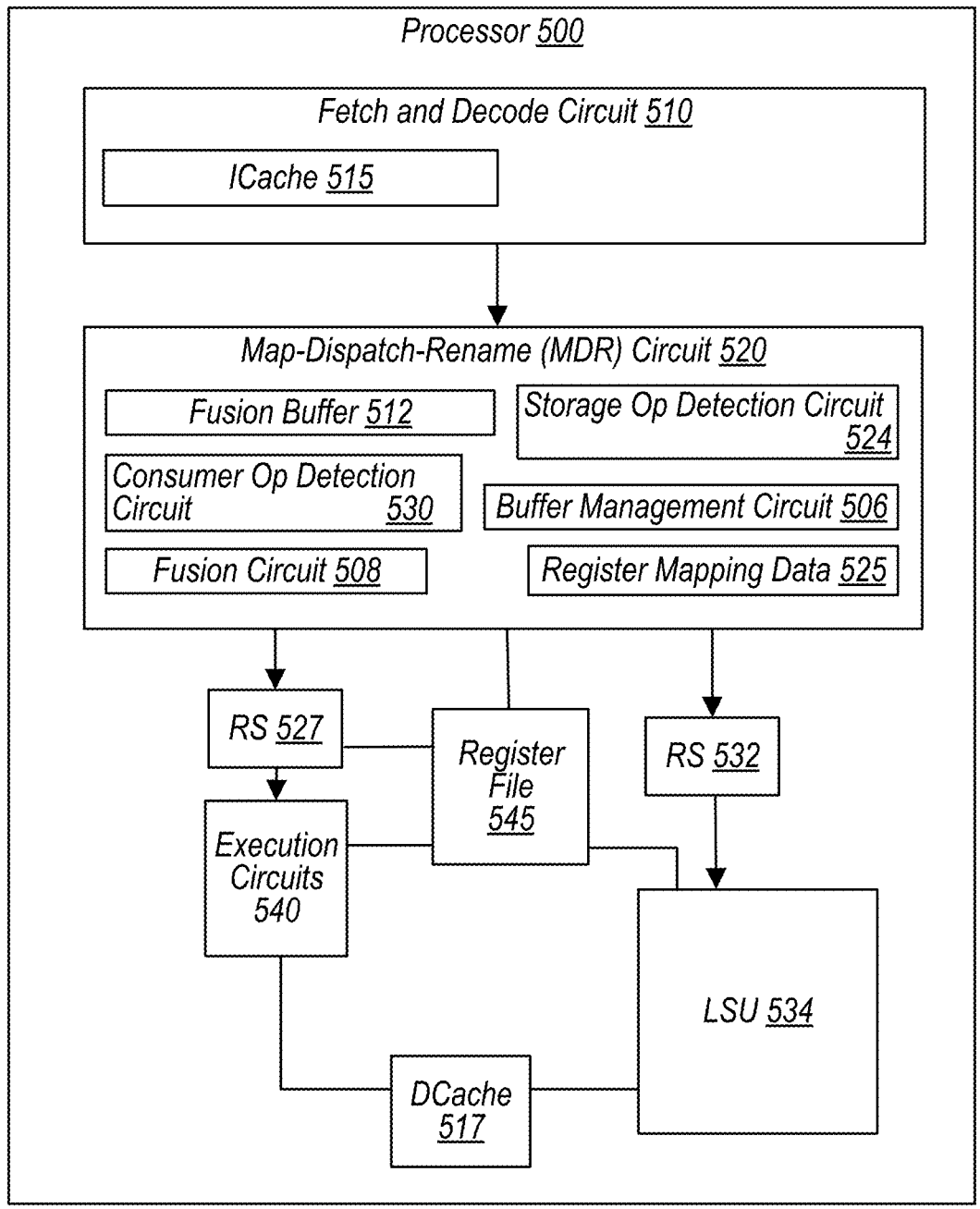
FIG. 5 is a block diagram illustrating example elements of a processor configured to manage operands using a fusion buffer, according to some embodiments.

FIG. 4 illustrates example elements of a coprocessor 400 configured to manage operands using multiple fusion buffers. Coprocessor 400 is similar to coprocessor 300 of FIG. 3 but includes first second and third op queues and first second and third execution circuits. In an embodiment, the different execution circuits and op queues are for different types of instructions. As an example, one execution circuit and op queue combination may be for load/store operations, one for grid-based operation execution, and one for operations using other types of execution circuitry. Coprocessor 400 also has two fusion buffers within MDR circuit 414. In an embodiment, operand management circuitry as described herein may use separate fusion buffers for corresponding separate execution pipelines.

As shown, coprocessor 400 includes instruction buffer 410, decode circuit 412, MDR circuit 414, data buffer 420, op queues 416 and execution circuits 418. Instruction buffer 410, decode circuit 412 and data buffer 420 are similar to instruction buffer 310, decode circuit 312 and data buffer 320, respectively, described in connection with FIG. 3 above. Op queues 416 include first op queue 434A, second op queue 434B and third op queue 434C, and execution circuits 418 include first execution circuitry 436A, second execution circuitry 436B and third execution circuitry 436C. In an embodiment, each of op queues 434A, 434B and 434C feeds a corresponding set of execution circuitry 436A, 436B and 436C. For example, first op queue 434A and first execution circuitry 436A may form a first execution pipeline, second op queue 434B and second execution circuitry 436B may form a second execution pipeline, and third op queue 434C and third execution circuitry 436C may form a third execution pipeline. In one embodiment, for example, load/store operations may be assigned to the first execution pipeline, grid-based operations may be assigned to the second execution pipeline and other types of operations may be assigned to the third execution pipeline. In various embodiments, coprocessor 400 is configured such that a given op queue can feed more than one set of execution circuitry. For example, a specialized execution unit such as a grid execution circuit or an interleave/de-interleave execution circuit may be accessible using more than one op queue in some embodiments.

MDR circuit 414 includes register mapping data 422, storage op detection circuit 424, first fusion buffer 426A, second fusion buffer 426B, buffer management circuit 428, consumer op detection circuit 430 and fusion circuit 432. In an embodiment, first fusion buffer 426A and second fusion buffer 426B are used for storing different types of storage instruction operations. For example, buffer 426A may be used for storing lookup table instruction operations such as decoded ARM LUTI instructions while buffer 426B is used for storing instruction operations for moving data from a storage array, such as decoded ARM MOVA instructions. In an embodiment, each of fusion buffers 426A and 426B is connected to a set of dispatch lanes leading to one of op queues 434A, 434B or 434C. In a further embodiment, each of buffers 426A and 426B are connected to dispatch lanes leading to a different op queue. In some embodiments, a fused instruction operation incorporating a storage instruction operation stored in one of fusion buffers 426A or 426B is dispatched to a different op queue for execution than the op queue that the buffered storage instruction operation was originally dispatched to.

Register mapping data 422, storage op detection circuit 424, buffer management circuit 428, consumer op detection circuit 430, and fusion circuit 432 are similar to corresponding circuits within MDR circuit 314 of FIG. 3, except that each of these elements is configured for use with two fusion buffers rather than one. Although shown as single circuits to simplify the block diagram of FIG. 4, any or all of circuits 424, 428, 430 or 432 may be implemented as separate circuits corresponding to each of fusion buffers 426A and 426B. Depending on factors such as the type of instructions being fused using buffers 426A or 426B, circuits 424, 428, 430 and 432 may implement different criteria for the different buffers in terms of storage, fusion, buffer vacate and/or drop operations. Example elements of coprocessor 400 are illustrated in FIG. 4, and multiple other elements may be included which are not shown. In various embodiments, for example, different numbers of op queues and/or execution circuits may be included.

FIG. 5 is a block diagram illustrating example elements of a core processor, or CPU processor, configured to manage operands using a fusion buffer. Processor 500 of FIG. 5 is another example of an implementation of processor 100 of FIG. 1. In some embodiments, processor 500 is a non-speculative processor. In the embodiment of FIG. 5, circuits that provide functionality of operand management circuitry such as circuitry 102 of FIG. 1 are included in an MDR circuit 520 of processor 500. In the illustrated embodiment, processor 500 includes fetch and decode circuit 510, MDR circuit 520, a set of reservation stations (RSs) 527 and 532, one or more execution circuits 540, a register file 545, a data cache, or "DCache," 517 and a load/store unit (LSU) 534. Execution circuits 540, in combination with reservation stations 527 and 532 in some embodiments, implement execution circuitry such as circuitry 106 of FIG. 1. In various embodiments, register file 545 implements data memory such as data memory 108 of FIG. 1. As depicted, fetch and decode circuit 510 includes an instruction cache, or "ICache," 215 and is coupled to MDR unit 520, which includes a buffer management circuit 506, fusion circuit 508, fusion buffer 512, storage op detection circuit 524, register mapping data 525 and consumer op detection circuit 530.

Fetch and decode circuit 510, in various embodiments, is configured to fetch instructions for execution by processor 500 and decode the instructions into instruction operations (briefly "ops") for execution. More particularly, fetch and decode circuit 510 may be configured to cache instructions fetched from a memory through an external interface into ICache 515. In embodiments for which processor 500 is a speculative processor, fetch and decode circuit 510 may be configured to fetch a speculative path of instructions for processor 500. As used herein an "instruction" is an executable entity defined in an ISA implemented by a processor such as processor 500 or coprocessors 300 and 400. In various embodiments, fetch and decode circuit 510 may decode an instruction into multiple ops depending on the complexity of that instruction. Particularly complex instructions may be microcoded. In such embodiments, the microcode routine for an instruction may be coded in ops. In other embodiments, however, each instruction within the instruction set architecture implemented by processor 500 may be decoded into a single op, and thus the op can be synonymous with its corresponding instruction (although it may be modified in form by the decoder). Accordingly, the term "instruction operation" or "op" may be used herein to refer to an operation that an execution circuit in a processor is configured to execute as a single entity.

ICache 515 and DCache 517, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 515/DCache 517 and a main memory, such as a last level cache. In various embodiments, ICache 515 is used to cache fetched instructions and DCache 517 is used to cache data fetched or generated by processor 500.

MDR circuit 520, in various embodiments, is configured to map ops received from fetch and decode circuit 510 to physical registers to permit execution. As shown, MDR circuit 520 can dispatch the ops to RS 527 or RS 532. Reservation stations 527 and 532 perform functions similar to op queues 316 of coprocessor 300 discussed in connection with FIG. 3 above. The ops may be mapped to physical registers in register file 545 from the architectural registers used in the corresponding instructions. In various embodiments, register file 545 functions in a manner similar to data buffer 320 of coprocessor 300. Register file 545 may implement a set of physical registers that are greater in number than the architectural registers specified by the instruction set architecture implemented by processor 500. As such, MDR circuit 520 may manage a mapping between the architectural registers and the physical registers. In some embodiments, there may be separate physical registers for different operand types (e.g., integer, floating-point, etc.). The physical registers, however, may be shared between different operand types in some embodiments.

MDR circuit 520 is further configured to implement operand management circuitry such as circuitry 102 of FIG. 1. Buffer management circuit 506, fusion circuit 508 and fusion buffer 512 are similar to buffer management circuit 328, fusion circuit 332 and fusion buffer 326 of coprocessor 300 described above in connection with FIG. 3. Similarly, storage op detection circuit 524, register mapping data 525 and consumer op detection circuit 530 are similar to storage op detection circuit 324, register mapping data 322 and consumer op detection circuit 330 of coprocessor 300.

LSU 534, in various embodiments, is configured to execute memory ops received from MDR circuit 520. Generally, a memory op is an instruction op specifying an access to memory, although that memory access may be completed in a cache such as DCache 517. As such, a load memory op may specify a transfer of data from a memory location to a register of processor 500, while a store memory op may specify a transfer of data from a register to a memory location.

Execution circuits 540, in various embodiments, include any types of execution circuits, and with respect to use of a fusion buffer as described herein function similarly to, for example, execution circuitry 106 of FIG. 1 and execution circuits 318 of FIG. 3. Execution circuits 540 may include integer execution circuits configured to execute integer ops, floating-point execution circuits configured to execute floating-point ops, or vector execution circuits configured to execute vector ops, as well as specialized execution circuits such as grid execution circuits and interleave/de-interleave circuits. Execution circuits 540 may generally be independent of each other in that each execution circuit may be configured to operate on an op that was issued to that execution circuit without dependence on other execution circuits 540. Any number and type of execution circuits 540 may be included in various embodiments, including embodiments having one execution circuit 540 and embodiments having multiple execution circuits 540.

Figure 6A:
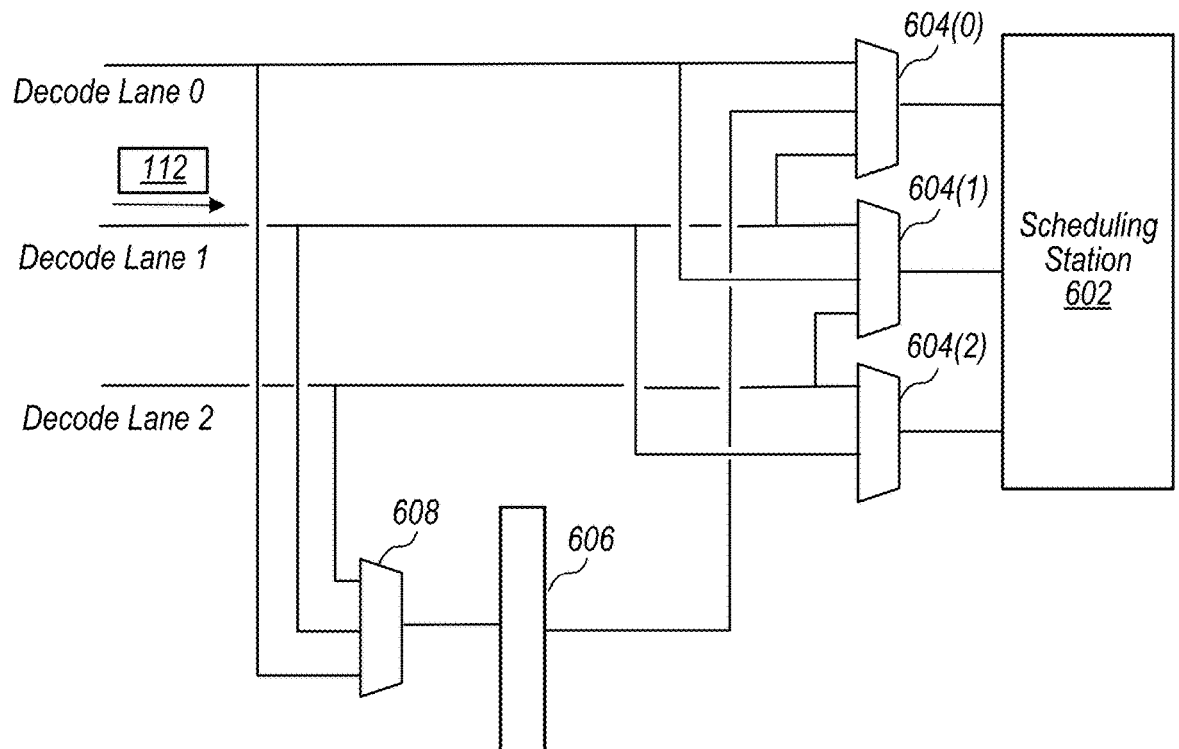
FIGS. 6A-6B are block diagrams illustrating storage of a storage instruction operation into a fusion buffer, according to some embodiments.

FIGS. 6A-8 illustrate example buffer management and fusion scenarios using a fusion buffer as described herein. As shown in FIG. 6A, decode lanes labeled 0, 1, and 2 are configured to carry decoded instructions toward a scheduling station 602. Decode lanes 0, 1 and 2 may also be referred to as dispatch lanes herein. In various embodiments, scheduling station 602 may be implemented as a reservation station and referred to as an op queue such as one of op queues 316 or 416 of FIGS. 3 and 4 or as a reservation station such as reservation station 527 or 532 of FIG. 5. In the embodiments of FIGS. 6A-8, decode lanes 0, 1 and 2 are connected to scheduling station 602 via multiplexers 604(0), 604(1) and 604(2). Each of the decode lanes is connected to a fusion buffer 606 via multiplexer 608. In an embodiment, fusion buffer 606, multiplexer 608 and associated interconnections form a portion of operand management circuitry such as circuitry 102 of FIG. 1. FIG. 6A illustrates one example configuration of decode/dispatch lanes for forwarding instruction operations to execution circuitry; other configurations may be used in other embodiments. For example, a different number of decode lanes or different multiplexer configurations may be used in other embodiments.

Figure 6B:
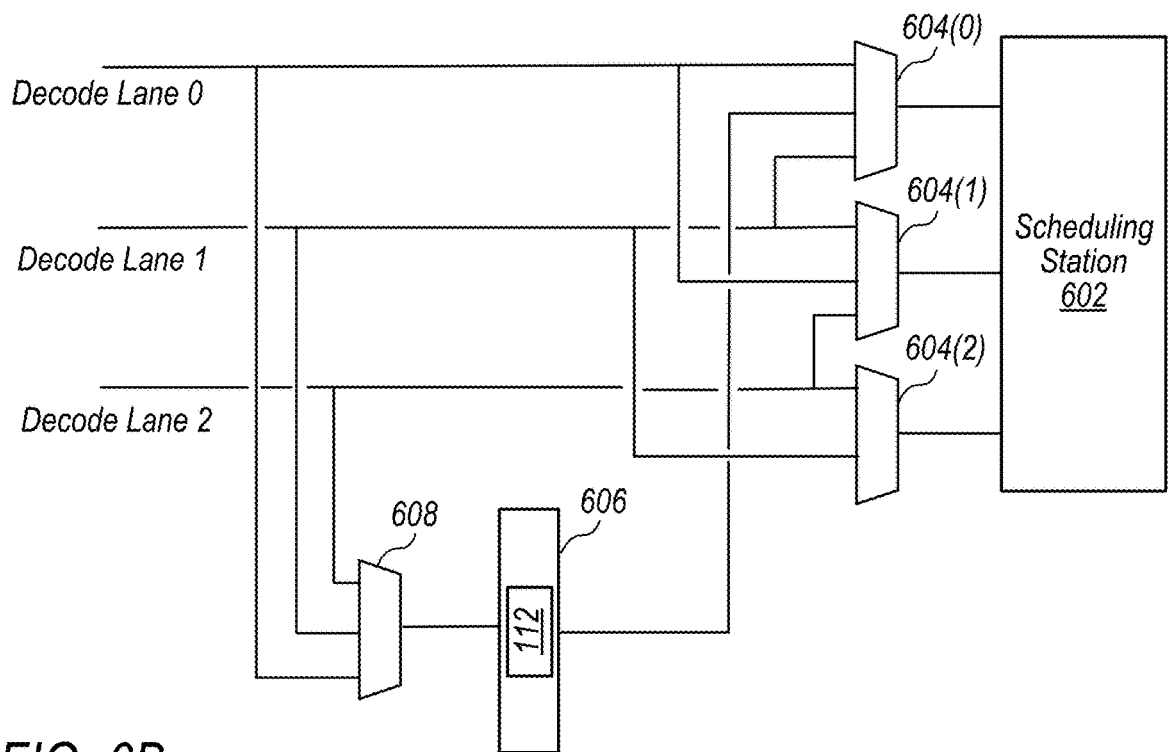

FIGS. 6A and 6B illustrate successive points in time as an incoming storage instruction operation 112 arrives in one of the decode lanes. In the embodiment of FIG. 6A, storage instruction operation 112 arrives in decode lane 1. Examples of storage instruction operations 112 are provided elsewhere in this disclosure, such as in connection with FIG. 1 above. In this example, storage instruction operation 112 is stored in fusion buffer 606, as illustrated in FIG. 6B. In various embodiments, storage instruction operation 112 is selected for placement into fusion buffer 606 through the operation of storage operation detection circuitry such as circuits 324, 424 or 524. In an embodiment, operation of the storage detection circuitry includes providing control signals to multiplexer 608. Placement of storage instruction operation 112 into fusion buffer 606 removes the instruction operation 112 from its normal execution flow toward scheduling station 602.

Figure 7A:
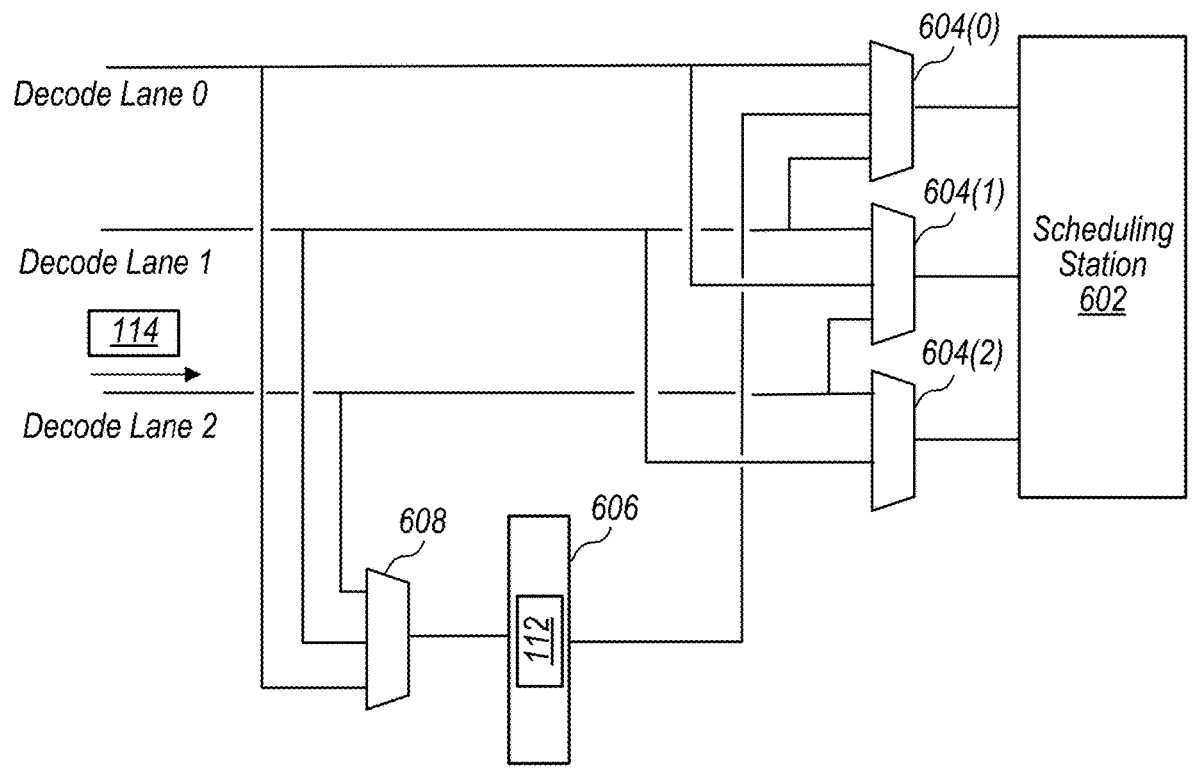
FIGS. 7A-7C are block diagrams illustrating scenarios of fusion of a consumer instruction operation with a buffered storage instruction operation, according to some embodiments.
Figure 7B:
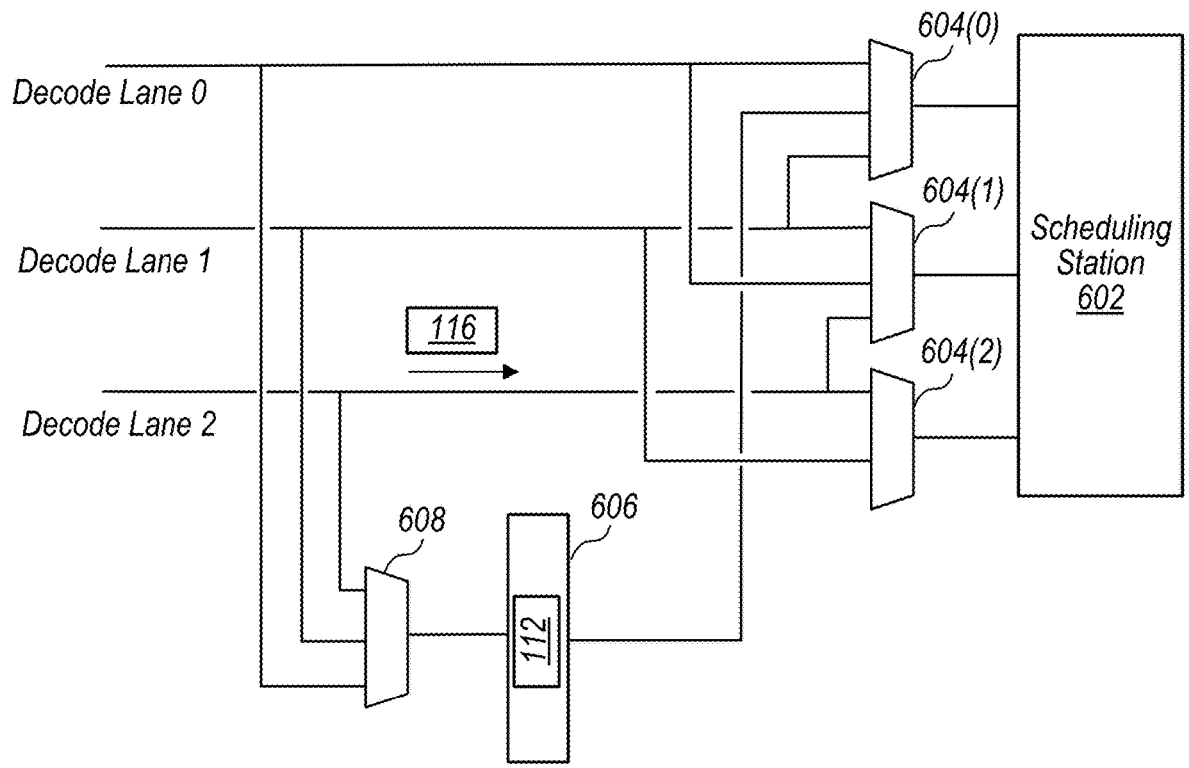
Figure 7C:
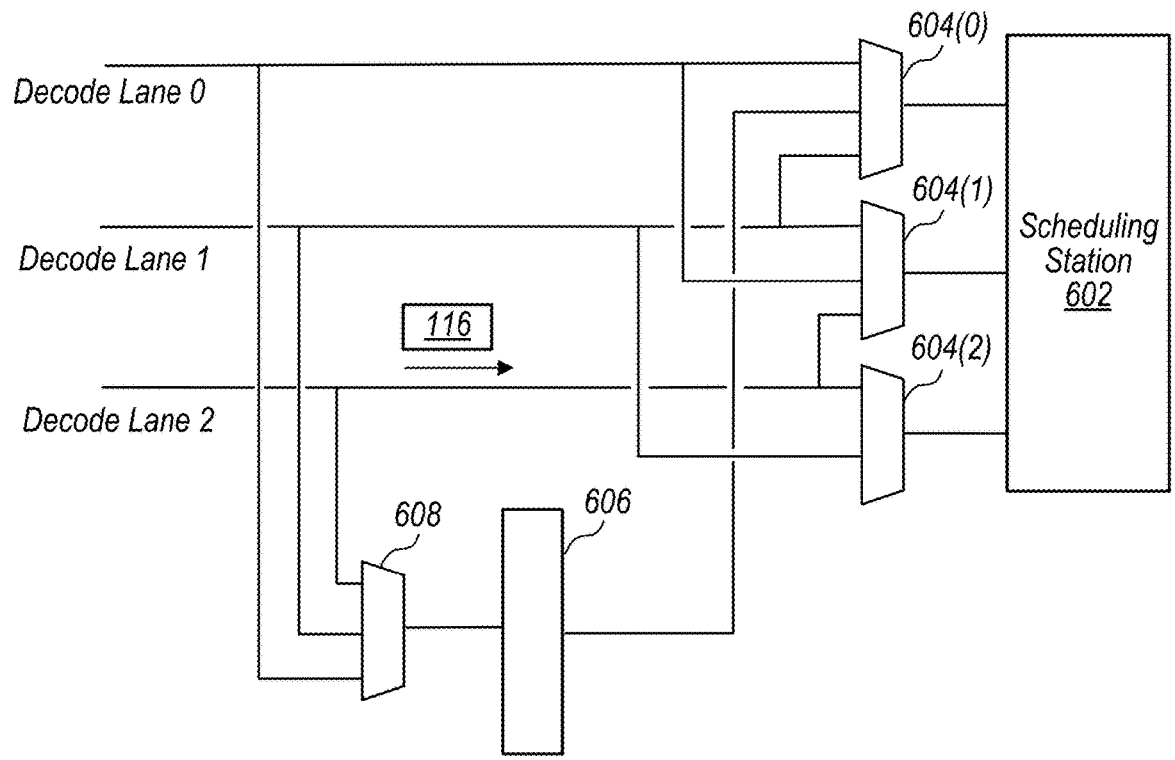

FIG. 7A illustrates a scenario in which a consumer instruction operation 114, executable to use an operand generated by execution of storage instruction operation 112, arrives in one of the decode lanes while storage operation 112 is in fusion buffer 606. Examples of consumer instruction operations 114 are provided elsewhere in this disclosure, such as in connection with FIG. 1 above. In various embodiments, consumer instruction operation 114 arrives in the same decode group as or in a later decode group than storage instruction operation 112.

FIG. 7B illustrates a scenario in which consumer instruction operation 114 of FIG. 7A has been fused for execution with storage instruction operation 112 to form fused instruction operation 116. In various embodiments, consumer instruction operation 114 is detected through operation of consumer operation detection circuitry such as circuits 330, 430 or 530, and evaluated, by the consumer operation circuitry and/or fusion circuitry such as fusion circuits 332, 432 or 508, for suitability for fused execution with storage instruction operation 112. As described in this disclosure, such as in connection with FIG. 1 above, fused instruction operation 116 is executable in various embodiments to obtain the operand generated by execution of storage instruction operation 112, or at least any portion of that operand needed by consumer instruction operation 114, without writing the operand to the destination registers specified by storage instruction operation 112. Execution of fused instruction operation 116 causes the obtained operand to be used in performing the operation specified by consumer instruction operation 114. In various embodiments, fused instruction operation 116 is generated through operation of fusion circuitry such as circuit 332, 432 or 508. In the embodiment of FIG. 7B, fused instruction operation 116 is forwarded for execution while storage instruction operation 112 is retained in fusion buffer 606. In various embodiments, storage instruction operation 112 is retained in fusion buffer 606 through operation of a buffer management circuit such as circuits 328, 428 or 506. In various embodiments, fused instruction operation 116 may be directed to scheduling station 602 or to a different scheduling station (not shown) for forwarding to appropriate execution circuitry.

FIG. 7C illustrates a different scenario than that of FIG. 7B involving fusion of consumer instruction operation 114 of FIG. 7A with storage instruction operation 112. In the embodiment of FIG. 7C, fused instruction operation 116 is forwarded for execution while storage instruction operation 112 is dropped from the fusion buffer. In various embodiments, storage instruction operation 112 is dropped from fusion buffer 606 through operation of a buffer management circuit such as circuits 328, 428 or 506. In the illustrated embodiment, a buffer vacate condition calling for removal of instruction operation 112 from the fusion buffer has been detected. In addition, a drop condition has been detected indicating that separate execution of instruction operation 112 is not needed. Writing to registers of the operand(s) generated by execution of storage instruction operation 112 has therefore been avoided.

FIG. 8 illustrates removal of storage instruction operation 112 from fusion buffer 606 and forwarding of storage instruction operation 112 to the execution pipeline for execution. In a scenario illustrated in FIG. 8, buffer management circuitry has detected a buffer vacate condition calling for removal of instruction operation 112 from fusion buffer 606 but has not detected a drop condition indicating that execution of instruction operation 112 is not necessary. The operands generated by execution of storage instruction operation 112 are therefore written to registers in this scenario.

FIG. 9 is a flow diagram illustrating an example method of operand management using a fusion buffer. Method 900 is one embodiment of a method performed by a processor, such as processor 100 of FIG. 1, coprocessors 300 of FIG. 3 or 400 of FIG. 4, or processor 500 of FIG. 5. In an embodiment, method 900 is performed by operand management circuitry within a processor. Other embodiments of a method may include more or fewer blocks than shown in FIG. 9. Method 900 includes, at block 910, detecting a first storage instruction operation that is executable to store, into one or more destination registers, one or more first operand values usable by one or more consumer instruction operations. In an embodiment, the first storage instruction operation is detected from among instruction operations received from a decode stage of a processor. Storage instruction operation 112 of FIG. 1 is an example of the first storage instruction operation. In some embodiments, the first storage instruction operation may include lookup table index values and be executable to use the index values to obtain operand values from a lookup table. An ARM LUTI instruction is one example of a storage instruction operation in such an embodiment. In some embodiments, the first storage instruction operation may be executable to move portions of a storage array to one or more destination registers to form one or more operand values. An ARM MOVA instruction is one example of this type of storage instruction operation.

Method 900 further includes, at block 920, storing the first storage instruction operation into a fusion buffer instead of allowing the first storage instruction operation to proceed along an execution pipeline of a processor carrying out method 900. Fusion buffers 104 of FIGS. 1 and 606 of FIGS. 6A-8 are examples of the fusion buffer that the first storage instruction operation is stored into, and an example of placement of a storage instruction into a fusion buffer is illustrated in FIG. 6B. At block 930, the method includes, in response to detecting a buffer vacate condition, removing the first storage instruction operation from the fusion buffer. In one embodiment, detecting the buffer vacate condition includes detecting, from among the instruction operations received by the operand management circuitry, a second storage instruction operation that is executable to store one or more second operand values usable by one or more consumer instruction operations. In other embodiments, detecting the buffer vacate condition may include detecting a satisfaction of one or more other criteria for vacating the buffer. Examples of such other criteria may include expiration of a time limit, arrival of an instruction operation assigned to the same execution pipeline, or arrival of certain system-level instruction operations. In various embodiments, detecting the buffer vacate condition may be performed using buffer management circuitry such as circuits 328, 428 or 506.

Method 900 also includes, at block 940, checking for a drop condition associated with the first storage instruction operation. In various embodiments, checking for the drop condition may be performed using buffer management circuitry such as circuits 328, 428 or 506. In an embodiment, checking for the drop condition includes determining whether more consumer instruction operations for the first storage instruction operation are in an execution pipeline of the processor and whether future consumer instruction operations for the first storage instruction operation will arrive. The method continues, at block 950, with, based on a result of the checking and after removing the first storage instruction operation from the fusion buffer, processing the first storage instruction operation.

What processing the first storage instruction operation at block 950 entails depends on the result of checking for the drop condition at block 940. For example, in one embodiment a result of checking for the drop condition is that a drop condition is detected, and processing the first storage instruction operation includes dropping the first storage instruction operation without forwarding the first storage instruction operation for execution. In this embodiment, the one or more first operand values that the first storage instruction operation is executable to store are not written to the one or more destination registers. In another embodiment, a result of checking for the drop condition is that a drop condition is not detected, and processing the first storage instruction operation includes forwarding the first storage instruction operation for execution. An example of the latter forwarding scenario is illustrated in FIG. 8. In such an embodiment, the one or more first operand values are written into the one or more destination registers as a result of execution of the first storage instruction operation.

In some embodiments, method 900 may further include, in response to detecting a first consumer instruction operation while the first storage instruction operation is in the fusion buffer, fusing the first storage instruction operation and the first consumer instruction operation into one or more first fused instruction operations. In such an embodiment, the first consumer instruction is eligible for fusion with the first storage instruction operation and is executable to use one or more of the one or more first operand values to perform a first operation. The first fused instruction operations are executable to obtain the one or more of the one or more first operand values and perform the first operation without writing the one or more of the one or more first operand values to the one or more destination registers. In an embodiment, the first consumer instruction operation is detected from among instruction operations received from a decode stage of a processor. Consumer instruction operation 114 of FIG. 1 is an example of the first consumer instruction operation. In one embodiment, where the first storage instruction operation is executable to move portions of a storage array to the one or more destination registers to form the one or more first operand values, the first consumer instruction operation is executable to reduce a bit width of one or more of the first operand values. In another embodiment, where the first storage instruction operation is executable to move portions of a storage array to the one or more destination registers to form the one or more first operand values, the first consumer instruction operation is executable to interleave or de-interleave elements of the one or more first operand values.

In some embodiments, method 900 may further include, after fusing the first consumer instruction operation with the first storage instruction operation, fusing a second consumer instruction operation with the first storage instruction operation. In an embodiment fusing the second consumer instruction operation with the first storage instruction operation is performed in response to detecting the second consumer instruction operation while the first storage instruction operation is in the fusion buffer. Such a situation may result from a scenario such as that shown in FIG. 7B, in which a consumer instruction operation is fused for execution with a storage instruction operation while the storage instruction operation is retained in the fusion buffer. The second consumer instruction operation in such an embodiment is eligible for fusion with the first storage instruction operation and is executable to use one or more of the one or more first operand values to perform a second operation.

Turning now to FIG. 10, a flow diagram of a method 1000 is shown. Method 1000 is one embodiment of a method, performed by a processor, of operand management using a fusion buffer. In an embodiment, method 1000 is performed by operand management circuitry within a processor. Descriptions and variations described in connection with method 900 of FIG. 9 apply to corresponding elements of method 1000 as well. Method 1000 includes, at block 1010, detecting a first storage instruction operation that is executable to store, into one or more destination registers, one or more first operand values usable by one or more consumer instruction operations. The method further includes, at block 1020, storing the first storage instruction operation into a fusion buffer instead of allowing the first storage instruction operation to proceed along an execution pipeline of a processor performing method 1000. Blocks 1010 and 1020 are similar to blocks 910 and 920 of method 900. If a drop condition is detected ("Yes" branch of decision block 1030), method 1000 includes, at block 1040, removing the first storage instruction operation from the fusion buffer without forwarding the first storage instruction operation for execution. This branch of method 1000 would not result in writing to destination registers of the operand values that the first storage instruction operation is executable to store. If a drop condition is not detected ("No" branch of decision block 1030), the method includes, at block 1050 and in response to detecting a buffer vacate condition, removing the first storage instruction from the fusion buffer and forwarding the first storage instruction operation for execution. This branch of method 1000 would result in writing of the operand values to destination registers.

In some embodiments, method 1000 may further include, in response to detecting a first consumer instruction operation while the first storage instruction operation is in the fusion buffer, fusing the first storage instruction operation and the first consumer instruction operation into one or more first fused instruction operations. In such an embodiment, the first consumer instruction is eligible for fusion with the first storage instruction operation and is executable to use one or more of the one or more first operand values to perform a first operation. The first fused instruction operations are executable to obtain the one or more of the one or more first operand values and perform the first operation without writing the one or more of the one or more first operand values to the one or more destination registers. Such fusion would be performed before or in conjunction with removal of the first storage instruction operation from the fusion buffer as described at block 1040 or 1050.

In additional embodiments, method 1000 may still further include, after fusing the first consumer instruction operation with the first storage instruction operation, fusing an additional consumer instruction operation with the first storage instruction operation. In an embodiment, fusing the additional consumer instruction operation with the first storage instruction operation is performed in response to detecting the additional consumer instruction operation while the first storage instruction operation is in the fusion buffer. In such an embodiment, the additional consumer instruction operation is eligible for fusion with the first storage instruction operation and is executable to use one or more of the one or more first operand values to perform an additional operation.

FIG. 11 is a flow diagram illustrating an example method 1100, performed by a processor, of operand management using a fusion buffer. In an embodiment, method 1100 is performed by operand management circuitry within a processor. Descriptions and variations described in connection with method 900 of FIG. 9 and method 1000 of FIG. 10 apply to corresponding elements of method 1100 as well. Method 1100 includes, at block 1110, detecting a first storage instruction operation that is executable to store, into one or more destination registers, one or more first operand values usable by one or more consumer instruction operations. The method further includes, at block 1120, storing the first storage instruction operation into a fusion buffer instead of allowing the first storage instruction operation to proceed along an execution pipeline of a processor performing method 1100. Blocks 1110 and 1120 are similar to blocks 910 and 920 of method 900 and blocks 1010 and 1020 of method 1000.

Method 1100 also includes, at block 1130, in response to detecting a first consumer instruction operation while the first storage instruction operation is in the fusion buffer, fusing the first storage instruction operation and the first consumer instruction operation into one or more first fused instruction operations. In an embodiment, the first consumer instruction is eligible for fusion with the first storage instruction operation and is executable to use one or more of the one or more first operand values to perform a first operation. In various embodiments, the first fused instruction operations are executable to obtain the one or more of the one or more first operand values and perform the first operation without writing the one or more of the one or more first operand values to the one or more destination registers. In an embodiment, the first consumer instruction operation is detected from among instruction operations received from a decode stage of a processor. Consumer instruction operation 114 of FIG. 1 is an example of the first consumer instruction operation. In one example embodiment, where the first storage instruction operation is executable to move portions of a storage array to the one or more destination registers to form the one or more first operand values, the first consumer instruction operation is executable to reduce a bit width of one or more of the first operand values. In another embodiment, where the first storage instruction operation is executable to move portions of a storage array to the one or more destination registers to form the one or more first operand values, the first consumer instruction operation is executable to interleave or de-interleave elements of the one or more first operand values.

Method 1100 further includes, at block 1140, in response to detecting a drop condition associated with the first storage instruction operation, removing the first storage instruction operation from the fusion buffer without forwarding the first storage instruction operation for execution. In an embodiment, detecting a drop condition includes determining that no more consumer instruction operations for the first storage instruction operation are in an execution pipeline of the processor. Detecting a drop condition may further include determining that no future consumer instruction operations will arrive. For example, execution of a fused instruction operation such as that resulting from the fusion of block 1130 may in some embodiments overwrite destination registers associated with the first storage instruction operation so that no additional instruction operations can use operands generated by the first storage instruction operation.

In some embodiments, method 1100 further includes removing the first storage instruction operation in response to detecting a buffer vacate condition. In various embodiments, such a vacate condition could be detected at any time while the first storage instruction operation is in the fusion buffer. As such, a vacate condition could remove any opportunity to fuse the first storage instruction operation for execution or drop the first storage instruction operation without executing it. In such embodiments, whether the first storage instruction operation is dropped or forwarded for execution depends on whether a drop condition is detected at the time of the removal from the buffer based on the vacate condition.

Figure 12A:
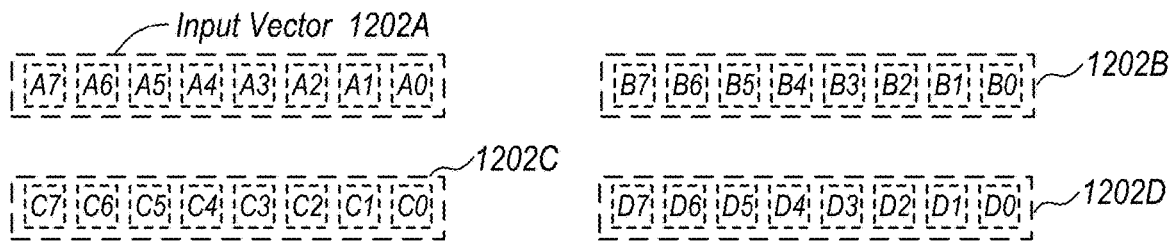
FIG. 12A is a block diagram illustrating example input vectors received by an interleave execution circuit performing an interleave operation, according to some embodiments.

Returning to the interleave execution circuit discussed above, FIGS. 12A-12F illustrate example input vectors, array contents and output row values at various stages of an interleave process using an interleave execution circuit such as circuit 200 of FIG. 2. A set of input vectors for an interleave execution circuit is shown in FIG. 12A. Input vectors 1202A, 1202B, 1202C and 1202D are examples of input vectors 216 of FIG. 2. For purposes of illustration, each element of the input vectors of FIG. 12A is labeled with a letter corresponding to the vector the element belongs to and a number corresponding to the element's position within the vector. In some embodiments, a number of elements in each input vector 1202 is a multiple of the number of input vectors being interleaved. (As used herein "multiple" as a noun refers to an integer multiple.) FIGS. 12B-12E illustrate contents of an array 1204 that is stored in an array storage circuit (such as circuit 202) of an interleave/de-interleave execution circuit (such as circuit 200) during an operation of interleaving the input vectors of FIG. 12A. In some embodiments, a number of elements in each input vector 1202 is a multiple of a number of rows in array 1204.

Figures 12B, 12C:
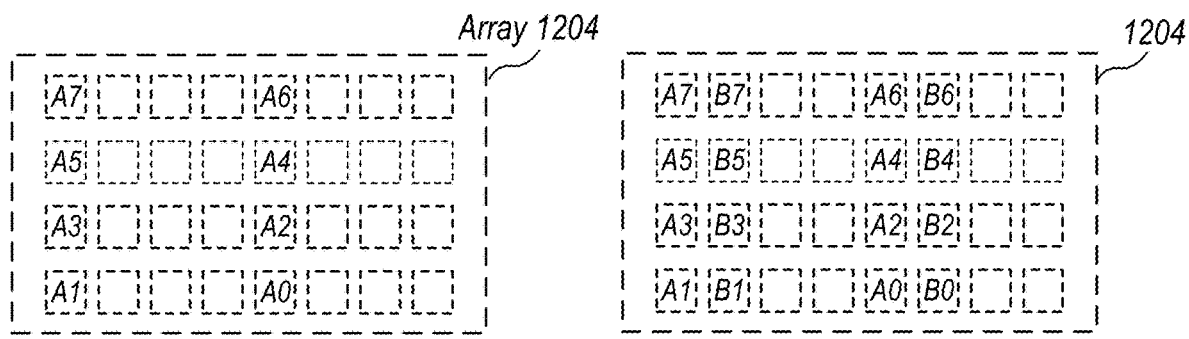
FIG. 12B is a block diagram illustrating example contents of an array that an interleave execution circuit is configured to store after a first pass of an interleave process, according to some embodiments.
FIG. 12C is a block diagram illustrating example contents of an array that an interleave execution circuit is configured to store after a second pass of an interleave process, according to some embodiments.

FIG. 12B illustrates contents of array 1204 after a first pass of storing the input vectors into an array storage circuit. In an embodiment, each pass of the storage operation is done in a single clock cycle. As illustrated, the elements of input vector 1202A are stored into array 1204 during the first pass. A first group of elements including elements A7, A5, A3 and A1 are stored into a first column of array 1204, where the first column is the leftmost column in this case. The remaining elements of vector 1202A form a second group of elements stored into a second column of array 1204, where the second column is the fifth column from the left in this case. These two columns form a subset of the columns of array 1204. As shown in FIG. 12B, the two columns within the subset are spaced apart from one another in the array by a number of columns (four) equal to the number of input vectors.

FIG. 12C illustrates contents of array 1204 after a second pass of storing the input vectors. As illustrated, the elements of input vector 1202B are stored into array 1204 during the second pass. A first group of elements from vector 1202B, including elements B7, B5, B3 and B1, are stored into a first column of array 1204, where the first column is the second column from the left in this case. The remaining elements of vector 1202B form a second group of elements stored into a second column of array 1204, where the second column is the sixth column from the left in this case. These two columns form a second subset of the columns of array 1204.

Figures 12D, 12E:
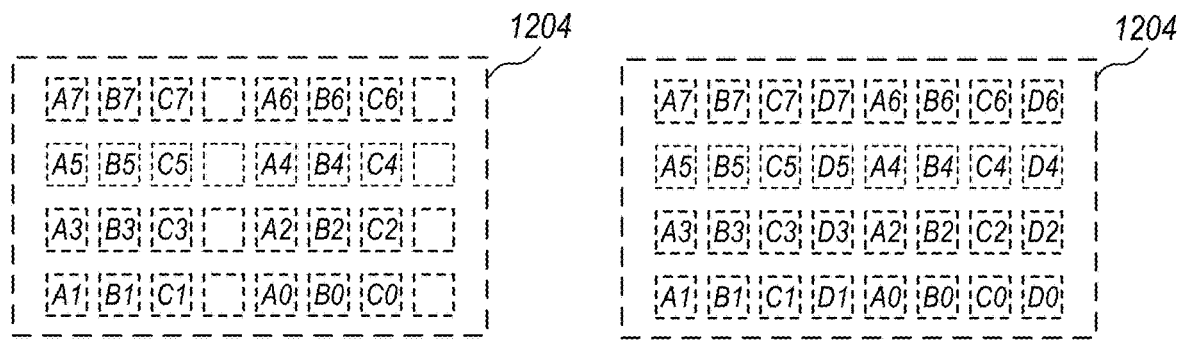
FIG. 12D is a block diagram illustrating example contents of an array that an interleave execution circuit is configured to store after a third pass of an interleave process, according to some embodiments.
FIG. 12E is a block diagram illustrating example contents of an array that an interleave execution circuit is configured to store after a fourth pass of an interleave process, according to some embodiments.

FIG. 12D illustrates contents of array 1204 after a third pass of storing the input vectors. As illustrated, the elements of input vector 1202C are stored into array 1204 during the third pass. A first group of elements from vector 1202C, including elements C7, C5, C3 and C1, are stored into a first column of array 1204, where the first column is the third column from the left in this case. The remaining elements of vector 1202C form a second group of elements stored into a second column of array 1204, where the second column is the seventh column from the left in this case. These two columns form a third subset of the columns of array 1204.

FIG. 12E illustrates contents of array 1204 after a fourth pass of storing the input vectors. As illustrated, the elements of input vector 1202D are stored into array 1204 during the fourth pass. A first group of elements from vector 1202D, including elements D7, D5, D3 and D1, are stored into a first column of array 1204, where the first column is the fourth column from the left in this case. The remaining elements of vector 1202D form a second group of elements stored into a second column of array 1204, where the second column is the rightmost column in this case. These two columns form a fourth subset of the columns of array 1204.

Figure 12F:
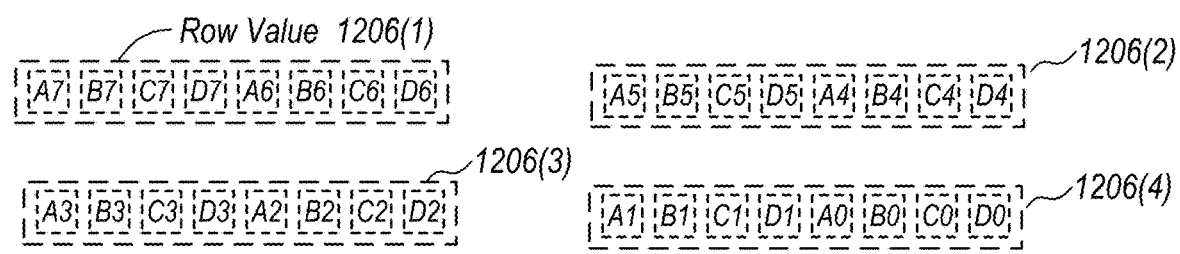
FIG. 12F is a block diagram illustrating example row values output by an interleave execution circuit performing an interleave operation, according to some embodiments.

As shown in FIG. 12E, the elements of array 1204 are filled when each of the input vectors has been written to the array. Moreover, the elements of the input vectors have been arranged such that each row of the array contains a portion of an interleaved result value in which elements of the input arrays are alternated in a regular sequence. Reading out the contents of array 1204 by rows, as described above in connection with the discussion of FIG. 2, will allow the interleaved result value to be stored. Row values 1206(1) through 1206(4) read out of array 1204 are shown in FIG. 12F.

In an embodiment, an array, such as array 1204, being stored in an array storage circuit of an interleave/de-interleave circuit is sized such that writing all of the input vectors to be interleaved into the array causes the elements of the array to be completely filled. For example, in various embodiments a number of rows in the array is equal to a number of input vectors to be interleaved and a number of columns in the array is equal to a number of elements in each input vector. The example of FIGS. 12A-12F corresponds to such an embodiment since there are four rows in array 1204, four input vectors 1202A-1202D, eight columns in array 1204 and eight elements in each input vector. Other array sizes may be used in other embodiments, however. For example, if the number of vectors to be interleaved is an even number, an array having a number of columns that is twice the number of elements in each input vector and a number of rows that is half the number of input vectors may also be suitable in some embodiments.

In some embodiments, writing of the input vectors into the array includes selecting elements, from a given input vector, for a group of elements to be written into a given column of the array such that the elements in the group are spaced apart within the given input vector by a ratio of the number of elements in an input vector to the number of rows in the array. The example of FIGS. 12A-12F corresponds to such an embodiment since the ratio of elements in an input vector 1202 to rows in array 1204 is two and the elements written to a given column are spaced apart by two (such as elements A7, A5, A3 and A1 in the leftmost column). In embodiments for which the number of columns in the array is equal to the number of elements in an input vector, elements within a group of elements written to a given column of the array may be spaced apart (within the input vector) by a ratio of the number of columns to the number of rows in the array.

In the example of FIGS. 12A-12F the number of elements in each input vector is twice the number of input vectors. Other input vector lengths are used in other embodiments. In some embodiments, input vector length in elements is much larger than a number of input vectors. The input vector length depends on the particular instruction giving rise to the interleave operation. In some embodiments, for example, input vectors may include 4, 8, 16, 32 or 64 elements. In an embodiment, a set of R input vectors is received by an interleave execution circuit such as circuit 200 of FIG. 2 to be interleaved, where each input vector has Q elements and Q is a multiple of R. In a further embodiment an array to be stored in an array storage circuit such as circuit 202 of FIG. 2 includes M columns and N rows, where Q is a multiple of N by a factor P. The R input vectors may be written into the array such that a number of columns in a subset of columns that a given input vector is written into is P, and elements from an input vector that are written into a given column are spaced apart from one another in the input vector by P elements. The P columns in a subset of columns are spaced R columns apart. Applying this framework to the example of FIGS. 12A-12F, R=4, Q=8, M=8, N=4 and P=2. As can be seen in FIGS. 12B-12E, each subset of columns for writing a given input vector has P columns, and the columns of the subset are spaced R columns apart. Elements within a given column are spaced P elements apart. In the case of a different example having four input vectors with 12 elements each, and an array having four rows and twelve columns, R=4, Q=12, M=12, N=4 and P=3. For such an example, elements can be written into the array such that each subset of columns for writing a given input vector includes three columns, and the elements written into a given column are spaced three elements apart in the input vector.

The example of FIGS. 12A-12F is one in which the number of elements in each input vector is a multiple of the number of input vectors (i.e., Q is a multiple of R, using the above notation). In some embodiments, however, the number of elements may not be a multiple of the number of input vectors. Consider, for example, an interleave process for a set of three input vectors having eight elements each. Using the notation of FIGS. 12A-12F but with only the three input vectors 1202A, 1202B and 1202C, a first 8-element interleaved row value beginning with element A7 would include elements A7, B7, C7, A6, B6, C6, A5 and B5. A next 8-element interleaved row would include elements C5, A4, B4, C4, A3, B3, C3 and A2, and the final 8-element interleaved row would include elements B2, C2, A1, B1, C1, A0, B0 and C0. To fill an array having 3 rows and 8 elements in this manner would involve distributing elements of each input vector among all columns of the array, rather than into particular pairs of columns as shown in FIGS. 12A through 12E for the case of four input vectors.

In an alternative embodiment of an interleave process for a set of 3 8-element input vectors, the 3 input vectors could be written by columns into a 4-row array in a manner similar to that of FIGS. 12B-12D, except that only 6 columns of the array would be filled. In one embodiment, the resulting array would look like the array of FIG. 12D but with the two empty columns as the two rightmost columns of the array. The four interleaved 6-element rows could then be read out of the array and written into appropriate elements of three interleaved 8-element result values.

FIGS. 13A-13F illustrate example interleaved values, array contents and output row values at various stages of a de-interleave process using an interleave execution circuit such as circuit 200 of FIG. 2. The de-interleave process illustrated by FIGS. 13A-13F can be used to implement what is effectively a reversal of the interleave process of FIGS. 12A-12F. Instead of receiving input vectors and producing interleaved values, as in FIGS. 12A-12F, the process of FIGS. 13A-13F receives interleaved values and produces the separate vectors. A set of interleaved values for input into the de-interleave process is shown in FIG. 13A. Interleaved values 1302(1), 1302(2), 1302(3) and 1302(4) correspond to row values 1206(1) through 1206(4) of FIG. 12F. The element labeling convention of FIGS. 12A-12F is continued in FIGS. 13A-13F, so that each interleaved value contains elements from each of four vectors corresponding to letters A, B, C and D. In an embodiment, the number of interleaved values 1302 is equal to the number of vectors having elements interleaved within values 1302. In various embodiments, the number of elements in each of values 1302 is a multiple of the number of interleaved values being de-interleaved. FIGS. 13B-13E illustrate contents of an array 1304 that is stored in an array storage circuit (such as circuit 202) of an interleave/de-interleave execution circuit (such as circuit 200) during an operation of de-interleaving the interleaved values of FIG. 13A. In some embodiments, a number of elements in each interleaved value 1302 is a multiple of a number of rows in array 1304.

Figures 13B, 13C:
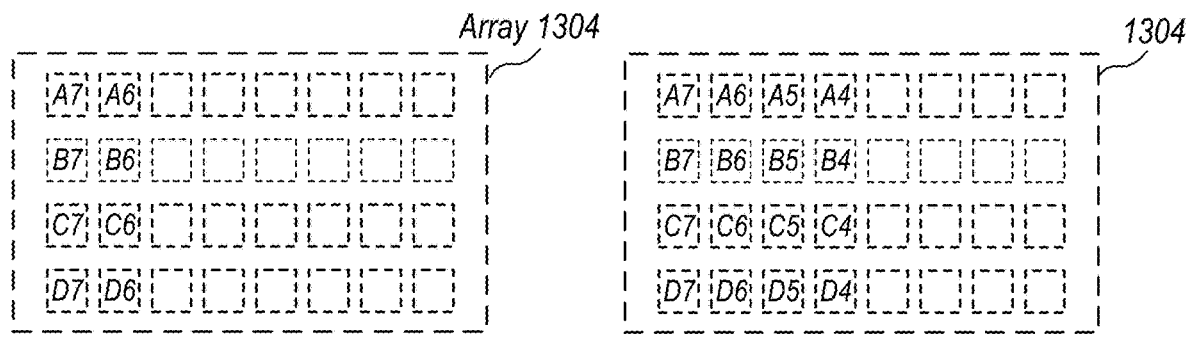
FIG. 13B is a block diagram illustrating example contents of an array that an interleave execution circuit is configured to store after a first pass of a de-interleave process, according to some embodiments.
FIG. 13C is a block diagram illustrating example contents of an array that an interleave execution circuit is configured to store after a second pass of a de-interleave process, according to some embodiments.

FIG. 13B illustrates contents of array 1304 after a first pass of storing the interleaved values into an array storage circuit. In an embodiment, each pass of the storage operation is done in a single clock cycle. As illustrated, the elements of interleaved value 1302(1) are stored into array 1304 during the first pass. A first group of elements including elements A7, B7, C7 and D7 are stored into a first column of array 1304, where the first column is the leftmost column in this case. The remaining elements of interleaved value 1302(1) form a second group of elements stored into a second column of array 1304, wherein the second column is the second column from the left in this case. These two columns form a subset of the columns of array 1304. By contrast to storing of input vector elements during the interleave process of FIGS. 12A-12F, storing of interleaved value elements for the de-interleave process of FIGS. 13A-13F involves storing groups of adjacent elements from the interleaved values 1302 into adjacent columns of array 1304, at least in the case of this example. Elements of the interleaved values 1302 are stored into array 1304 in such a way that elements from different source vectors are sorted into different rows, as shown.

FIG. 13C illustrates contents of array 1304 after a second pass of storing the interleaved values. As illustrated, the elements of interleaved value 1302(2) are stored into array 1304 during the second pass. A first group of elements including elements A5, B5, C5 and D5 are stored into a first column of array 1304, where the first column is the third column from the left in this case. The remaining elements of interleaved value 1302(2) form a second group of elements stored into a second column of array 1304, wherein the second column is the fourth column from the left in this case. These two columns form a second subset of the columns of array 1304.

Figures 13D, 13E:
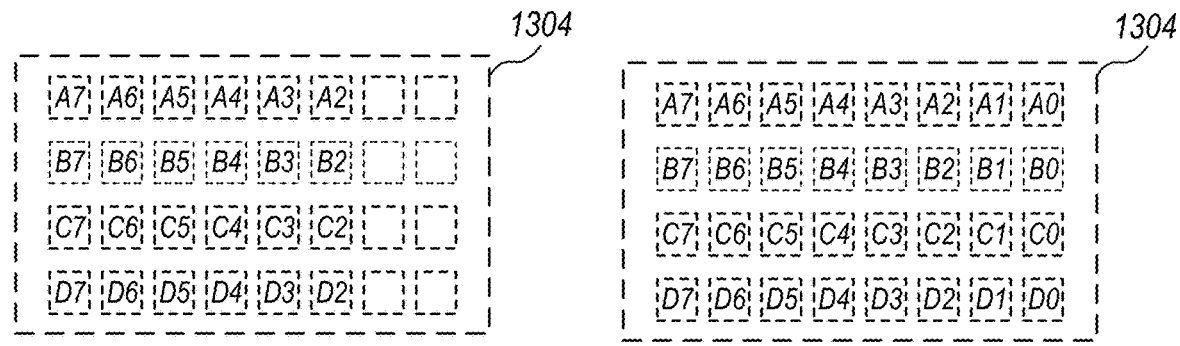
FIG. 13D is a block diagram illustrating example contents of an array that an interleave execution circuit is configured to store after a third pass of a de-interleave process, according to some embodiments.
FIG. 13E is a block diagram illustrating example contents of an array that an interleave execution circuit is configured to store after a fourth pass of a de-interleave process, according to some embodiments.

FIG. 13D illustrates contents of array 1304 after a third pass of storing the interleaved values. As illustrated, the elements of interleaved value 1302(3) are stored into array 1304 during the third pass. A first group of elements including elements A3, B3, C3 and D3 are stored into a first column of array 1304, where the first column is the fifth column from the left in this case. The remaining elements of interleaved value 1302(3) form a second group of elements stored into a second column of array 1304, wherein the second column is the sixth column from the left in this case. These two columns form a third subset of the columns of array 1304.

FIG. 13E illustrates contents of array 1304 after a fourth pass of storing the interleaved values. As illustrated, the elements of interleaved value 1302(4) are stored into array 1304 during the fourth pass. A first group of elements including elements A1, B1, C1 and D1 are stored into a first column of array 1304, where the first column is the seventh column from the left in this case. The remaining elements of interleaved value 1302(4) form a second group of elements stored into a second column of array 1304, wherein the second column is the rightmost column in this case. These two columns form a fourth subset of the columns of array 1304.

Figure 13F:
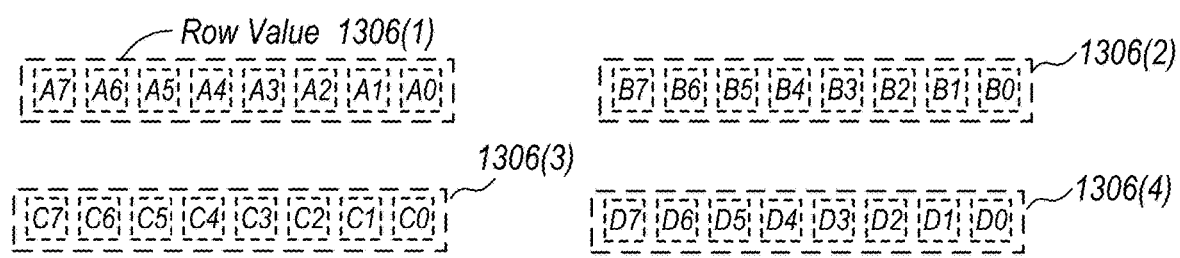
FIG. 13F is a block diagram illustrating example row values output by an interleave execution circuit performing a de-interleave operation, according to some embodiments.

As shown in FIG. 13E, the elements of array 1304 are filled when each of the interleaved values has been written to the array. Moreover, the elements of the interleaved values have been arranged such that each row of the array contains one of the interleaved vectors. Reading out the contents of array 1304 by rows, as described above in connection with the discussion of FIG. 2, will allow the de-interleaved vectors to be stored. Row values 1306(1) through 1306(4), corresponding to vectors 1202A through 1202D of FIG. 12A, are shown in FIG. 13F.

In an embodiment, an array, such as array 1304, being stored in an array storage circuit of an interleave/de-interleave circuit is sized such that writing into the array of all of the interleaved values to be de-interleaved causes the elements of the array to be completely filled. For example, in various embodiments a number of rows in the array is equal to a number of interleaved values to be de-interleaved and a number of columns in the array is equal to a number of elements in each interleaved value. Such an embodiment may be advantageous in allowing efficient use of the same circuit both for interleaving a group of vectors and for de-interleaving interleaved values to recover separate vectors. Other array sizes may be used in other embodiments of a de-interleave process, however.

Figure 14A:
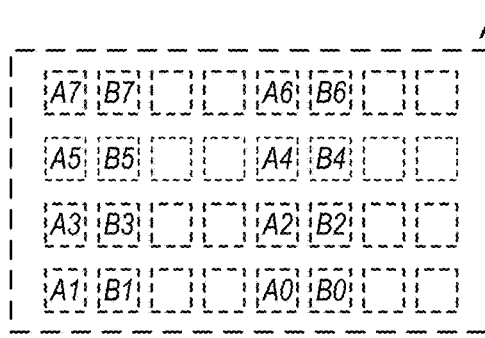
FIG. 14A is a block diagram illustrating example contents of an array that an interleave execution circuit using two input data ports is configured to store after a first pass of an interleave process, according to some embodiments.
Figure 14B:
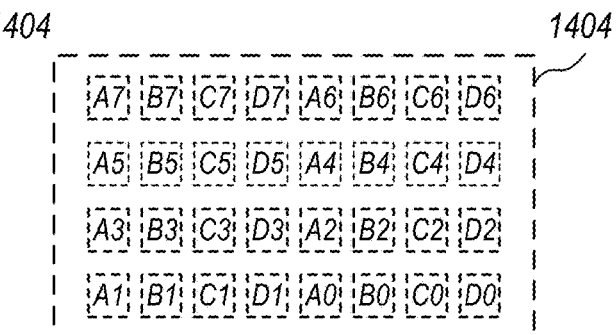
FIG. 14B is a block diagram illustrating example contents of an array that an interleave execution circuit using two input data ports is configured to store after a second pass of an interleave process, according to some embodiments.

FIGS. 14A and 14B illustrate array contents at various stages of an interleave process using an interleave execution circuit having two input data ports. FIGS. 12B-12E illustrate writing of input vector elements into an array 1204, where elements from one input vector are written into the array during each pass of the operation. In an embodiment, each pass is performed during one clock cycle. Writing of a single input vector per pass corresponds to an embodiment for which a single write port is available for writing input vectors 216 of FIG. 2 to array storage circuit 202. In execution circuit embodiments having more available write ports, multiple input vectors may be written to an array storage circuit in a single pass. FIGS. 14A-14B illustrate contents of an array 1404 that is stored in an array storage circuit such as circuit 202. FIG. 14A illustrates the contents of array 1404 after a single pass of storing the input vectors of FIG. 12A into an array storage circuit. In an embodiment, array 1404 is stored in an array storage circuit of an interleave circuit having two write ports available for writing input vectors to its array storage circuit. As such, a single pass results in storage of elements of both input vector 1202A and input vector 1202B into array 1404. Similarly, a second pass results in storing vectors 1202C and 1202D into array 1404, as shown in FIG. 14B. The number of passes needed for an interleave or de-interleave operation depends on the number of write ports that an interleave execution circuit is configured to use.

The latency limitations described above for interleave execution circuitry were related to a number of available write ports for writing data into an array storage circuit. Reading rows out of the array storage circuit is subject to similar limitations based on a number of available write ports. In an embodiment, if a single write port is available for moving rows out of the array storage circuit, only one row can be read out per cycle. This may cause a delay in processing new interleave or de-interleave operations. The interleave execution circuit embodiments of FIGS. 15 and 16 include additional elements for addressing such a delay.

FIG. 15 illustrates an embodiment of an interleave execution circuit 1500 including a side buffer circuit allowing the array storage circuit to be emptied during a single cycle even when only one write port is available. Descriptions and variations described in connection with execution circuit 200 of FIG. 2 apply to corresponding elements of circuit 1500 as well. As illustrated, execution circuit 1500 includes an array storage circuit 1502 coupled to a control circuit 1504, a buffer circuit 1506 and a write port 1508. In the embodiment of FIG. 15, write port 1508 is configured to select one of its four inputs at a time to write to storage outside of execution circuit 1500. In addition to writing input values into array storage circuit 1502 through processes described in connection with FIGS. 12A-14B above, control circuit 1504 is configured to cause three rows of an array stored in array storage circuit 1502 to be stored into buffer circuit 1506 while the remaining row is written out of the circuit through write port 1508. In an embodiment, side buffer 1506 is configured to store all rows but one of an array stored by array storage circuit 1502, for an embodiment having one output write port 1508. In various embodiments, array storage circuit 1502 can be emptied during one clock cycle, with rows of its stored array going either into buffer circuit 1506 or out through write port 1508. Emptying of array storage circuit 1502 allows data for a new interleave or de-interleave operation to be written into array storage circuit 1502 during subsequent cycles, as the rows stored in buffer 1506 are being written out one by one using write port 1508.

FIG. 16 illustrates an embodiment of an interleave execution circuit 1600 including two array storage circuits. Descriptions and variations described in connection with execution circuit 200 of FIG. 2 and execution circuit 1500 of FIG. 15 apply to corresponding elements of circuit 1600 as well. As illustrated, execution circuit 1600 includes two array storage circuits 1602A and 1602 B coupled to control circuit 1604 and write port 1608. In the embodiment of FIG. 16, write port 1608 is configured to select one of its eight inputs at a time to write to storage outside of execution circuit 1600. Control circuit 1604 is configured to alternate between use of array storage circuits 1602A and 1602B in performing successive interleave or de-interleave operations. For example, in an embodiment for which execution circuit 1600 uses a single write port (not shown) for writing into an array storage circuit, control circuit 1604 may use four cycles to fill array storage circuit 1602A with four input values for interleaving or de-interleaving. Once all elements of an array are stored in array storage circuit 1602A, its four rows may be read out sequentially through write port 1608 during four more cycles. During those four cycles for writing out the rows of array storage circuit 1602A input values can be stored in array storage circuit 1602B, so that starting a new interleave or de-interleave operation does not need to be delayed until array storage circuit 1602A is emptied.

FIG. 17 illustrates an embodiment of a method relating to an interleave process using an interleave execution circuit as described herein. Method 1700 is one embodiment of a method performed by an interleave execution circuit, such as circuits 200, 1500 or 1600, of a processor, such as processor 100 of FIG. 1, coprocessors 300 of FIG. 3 or 400 of FIG. 4, or processor 500 of FIG. 5. In some embodiments, the processor is a coprocessor configured to perform vector and matrix operations. In an embodiment, method 1700 is performed by a control circuit within an interleave execution circuit. Method 1700 includes, at block 1710, receiving, by execution circuitry of a processor, multiple input vectors, where the execution circuitry includes a first array storage circuit configured to store elements of a first array having a plurality of rows and a plurality of columns. Input vectors 1202A-1202D are examples of the multiple input vectors received. Array storage circuits 202, 1502, 1602A and 1602B are examples of the first array storage circuit included in the execution circuitry. Arrays 208, 1204 and 1304 are examples of the first array that the first array storage circuit is configured to store.

Method 1700 also includes, at block 1720, writing the multiple input vectors to the first array storage circuit such that elements of a given input vector are split among multiple columns of the plurality of columns and a given row of the plurality of rows has interleaved elements of the multiple input vectors. In some embodiments the multiple columns are columns of a given subset of the plurality of columns. An example of input vectors written such that elements of a given input vector are split among multiple columns of a given subset of the plurality of columns and a given row of the plurality of rows has interleaved elements of the multiple input vectors is shown in FIG. 12E. In the example of FIG. 12E, elements of each input vector are split among two columns forming a subset of columns for that input vector. For example, elements of input vector 1202A are split between columns of a subset including the first and fifth columns from the left of array 1204, while elements of input vector 1202C are split between columns of a subset including the third and seventh columns from the left. Each row of the array in FIG. 12E includes interleaved elements from all of input vectors 1202A-1202D.

In some embodiments, the first array has M columns and N rows, each input vector has Q elements, Q is a multiple of N by a factor P, and writing the multiple input vectors to the first array storage circuit includes writing the multiple input vectors such that elements of a given input vector that are written into a given column are spaced apart by P elements within the given input vector. Such embodiments are described in connection with FIGS. 12A-12F above. In a further embodiment, a given subset of the plurality of columns includes P columns and the P columns in a given subset are spaced apart from one another in the first array by a number of columns equal to a number of input vectors in the multiple input vectors. In some embodiments the number of columns M is also a multiple of the number of rows N by a factor P.

In some embodiments, the multiple columns that elements of a given input vector are split among in block 1720 include all of the columns of the array. This may be the case when the number of elements in an input vector is not a multiple of the number of input vectors, for example.

In some embodiments, the first array storage circuit includes element storage circuits corresponding to respective elements of the first array. Element storage circuits 206 of FIG. 2 are examples of the element storage circuits in the first array storage circuit, and elements 210 are examples of corresponding elements of the first array. In further embodiments, writing the multiple input vectors to the first array storage circuit includes, for a given input vector, writing a first group of elements of the given input vector into element storage circuits corresponding to elements in a first column in a corresponding subset of the plurality of columns and writing additional elements of the given input vector into element storage circuits corresponding to elements of additional columns in the corresponding subset. In still further embodiments, elements in the first group of elements are spaced apart in the given input vector by a ratio of a number of elements in the input vector to a number of rows in the first array.

Method 1700 of FIG. 17 further includes, at block 1730, outputting data corresponding to rows of the first array to form one or more result values. Row values 1206(1)-1206(4) of FIG. 12F are examples of the result values. In some embodiments, the execution circuitry also includes a buffer circuit configured to store data output from the first array storage circuit. Execution circuit 1500 with buffer circuit 1506 is an example of such execution circuitry. In some such embodiments, outputting data corresponding to rows of the first array includes emptying the first array storage circuit by sending data corresponding to each of the plurality of rows to either an entry of the buffer circuit or a data port of the execution circuitry. In an embodiment, such emptying is performed during a given single clock cycle of the processor. Write port 1508 of FIG. 15 is an example of a data port of the execution circuitry.

In some other embodiments, the execution circuitry includes a second array storage circuit configured to store elements of a second array. Execution circuit 1600 of FIG. 16 is an example of such execution circuitry. In some such embodiments, method 1700 further includes receiving multiple additional input values and writing the multiple additional input values to the second array storage circuit while outputting the data corresponding to rows of the first array from the first array storage circuit. In such an embodiment, the rows of the first array may be outputted one by one using a single write port without slowing the process of writing new input values as a second array to the second array storage circuit. In some embodiments such additional or new input values are additional input vectors and the next operation to be performed by the execution circuitry is an additional interleave operation. In other embodiments, such additional input values are interleaved input values and the next operation to be performed by the execution circuitry is a de-interleave operation such as that described in connection with FIG. 18 below.

FIG. 18 illustrates an embodiment of a method relating to a de-interleave process using an interleave execution circuit as described herein. Method 1800 is one embodiment of a method performed by an interleave execution circuit, such as circuits 200, 1500 or 1600, of a processor, such as processor 100 of FIG. 1, coprocessors 300 of FIG. 3 or 400 of FIG. 4, or processor 500 of FIG. 5. In some embodiments, the processor is a coprocessor configured to perform vector and matrix operations. In an embodiment, method 1800 is performed by a control circuit within an interleave execution circuit. In some embodiments, a single interleave execution circuit is configured to perform both an interleave process such as method 1700 and a de-interleave process such as method 1800. In some embodiments, a method includes performing both an interleave process and a de-interleave process. Descriptions and variations provided in connection with method 1700 apply to corresponding elements of method 1800 as well.

Method 1800 includes, at block 1810, receiving, by execution circuitry of a processor, multiple interleaved input values, where the execution circuitry includes a first array storage circuit configured to store elements of a first array having a plurality of rows and a plurality of columns. Interleaved values 1302(1)-1302(4) are examples of the multiple interleaved input values received. Method 1800 also includes, at block 1820, writing the multiple interleaved input values to the first array storage circuit such that elements of a given interleaved input value are split among multiple columns of a given subset of the plurality of columns and a given row of the plurality of rows has ordered elements of a vector. An example of interleaved input values written such that elements of a given value are split among multiple columns of a given subset and a given row has ordered elements of a vector is shown in FIG. 13E. In the example of FIG. 13E, elements of each interleaved input value are split among two columns forming a subset of columns for that input vector. For example, elements of input value 1302(2) are split between columns of a subset including the third and fourth columns from the left in array 1304, while elements of input value 1302(4) are split between columns of a subset including the two rightmost columns of the array. Each row of the array in FIG. 13E includes ordered elements matching one of the vectors 1202A-1202D. In some embodiments, the columns of a given subset of columns are adjacent to one another in the first array, as illustrated by the example of FIGS. 13A-13F. In some embodiments, the elements of a given interleaved value written into a given column of the first array are adjacent elements within the interleaved value.

Method 1800 further includes, at block 1830, outputting data corresponding to rows of the first array to form one or more vector result values. Row values 1306(1)-1306(4) of FIG. 13F are examples of the vector result values. In some embodiments, the execution circuitry also includes a buffer circuit configured to store data output from the first array storage circuit. In some such embodiments, outputting data corresponding to rows of the first array includes emptying the first array storage circuit by sending data corresponding to each of the plurality of rows to either an entry of the buffer circuit or a data port of the execution circuitry. In an embodiment, such emptying is performed during a given single clock cycle of the processor. In some other embodiments, the execution circuitry includes a second array storage circuit configured to store elements of a second array. In some such embodiments, method 1800 further includes receiving multiple additional input values and writing the multiple additional input values to the second array storage circuit while outputting the data corresponding to rows of the first array from the first array storage circuit. In such an embodiment, the rows of the first array may be outputted one by one using a single write port without slowing the process of writing new input values as a second array to the second array storage circuit. In some embodiments such additional input values are additional interleaved input values and the next operation to be performed by the execution circuitry is an additional de-interleave operation. In other embodiments, such additional input values are input vectors and the next operation to be performed by the execution circuitry is an interleave operation.

Example Device

Figure 19:
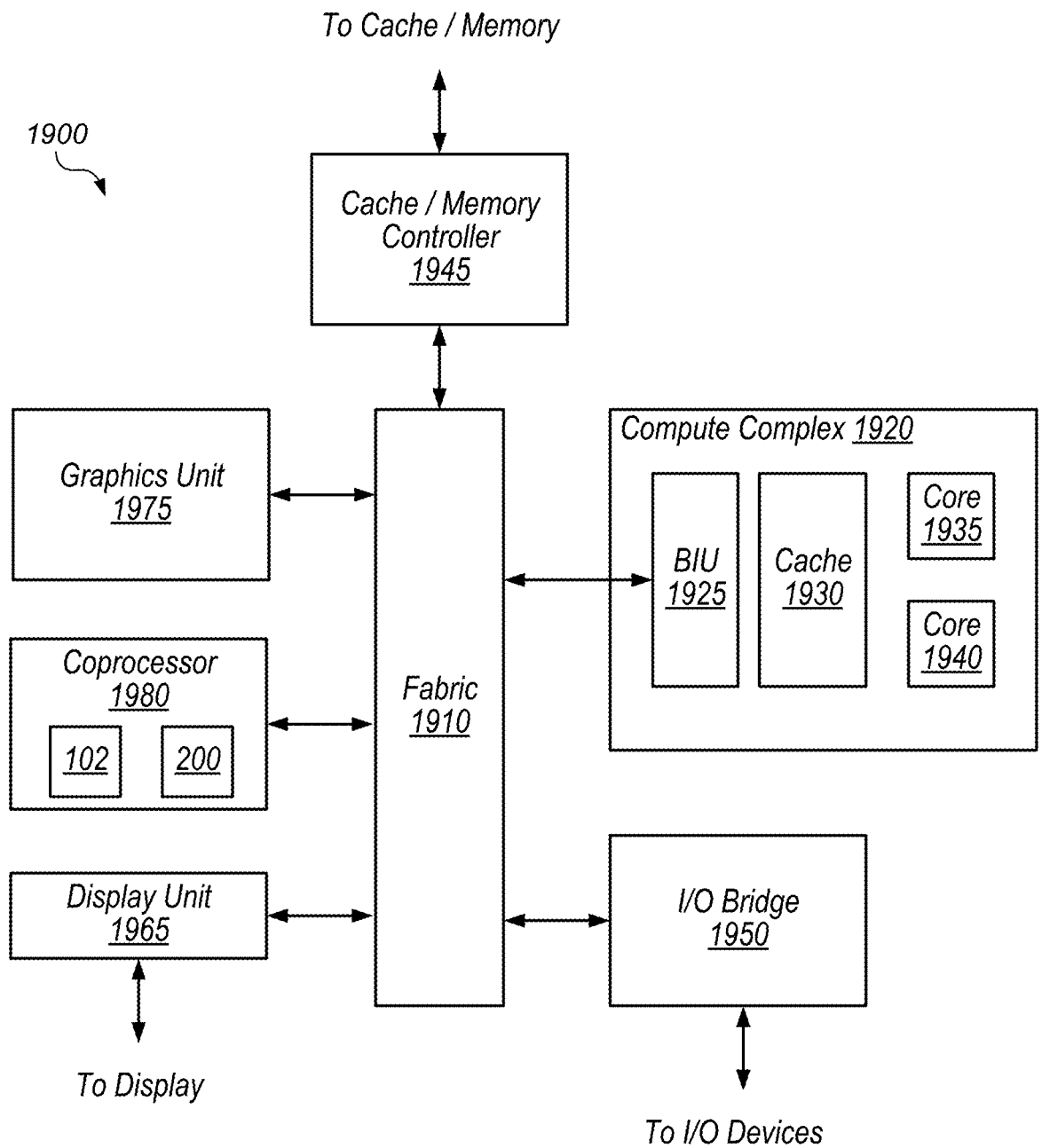
FIG. 19 is a block diagram illustrating example elements of a computing device, according to some embodiments.

Referring now to FIG. 19, a block diagram illustrating an example embodiment of a device 1900 is shown. In some embodiments, elements of device 1900 may be included within a system on a chip. In some embodiments, device 1900 may be included in a mobile device, which may be battery-powered. Therefore, power consumption by device 1900 may be an important design consideration. In the illustrated embodiment, device 1900 includes fabric 1910, compute complex 1920, input/output (I/O) bridge 1950, cache/memory controller 1945, graphics unit 1975, coprocessor 1980 and display unit 1965. In some embodiments, device 1900 may include other components (not shown) in addition to or in place of the illustrated components, such as video processor encoders and decoders, image processing or recognition elements, computer vision elements, etc. As illustrated, coprocessor 1980 includes operand management circuitry 102 as described in connection with FIG. 1 and an execution circuit 200 as described in connection with FIG. 2. In other embodiments one or both of circuitry 102 and circuit 200 may be missing from coprocessor 1980. In some embodiments, one or both of circuitry 102 and circuit 200 may be included in a different processor such as core 1935 or core 1940.

Fabric 1910 may include various interconnects, buses, MUX's, controllers, etc., and may be configured to facilitate communication between various elements of device 1900. In some embodiments, portions of fabric 1910 may be configured to implement various different communication protocols. In other embodiments, fabric 1910 may implement a single communication protocol and elements coupled to fabric 1910 may convert from the single communication protocol to other communication protocols internally.

In the illustrated embodiment, compute complex 1920 includes bus interface unit (BIU) 1925, cache 1930, and cores 1935 and 1940. In various embodiments, compute complex 1920 may include various numbers of processors, processor cores and caches. For example, compute complex 1920 may include 1, 2, or 4 processor cores, or any other suitable number. In one embodiment, cache 1930 is a set associative L2 cache. In some embodiments, cores 1935 and 1940 may include internal instruction and data caches. In some embodiments, a coherency unit (not shown) in fabric 1910, cache 1930, or elsewhere in device 1900 may be configured to maintain coherency between various caches of device 1900. BIU 1925 may be configured to manage communication between compute complex 1920 and other elements of device 1900. Processor cores such as cores 1935 and 1940 may be configured to execute instructions of a particular instruction set architecture (ISA) which may include operating system instructions and user application instructions. These instructions may be stored in computer readable medium such as a memory coupled to memory controller 1945 discussed below. Processor 500 of FIG. 5 is an example of a processor core such as cores 1935 and 1940.

As used herein, the term "coupled to" may indicate one or more connections between elements, and a coupling may include intervening elements. For example, in FIG. 19, graphics unit 1975 may be described as "coupled to" a memory through fabric 1910 and cache/memory controller 1945. In contrast, in the illustrated embodiment of FIG. 19, graphics unit 1975 is "directly coupled" to fabric 1910 because there are no intervening elements.

Cache/memory controller 1945 may be configured to manage transfer of data between fabric 1910 and one or more caches and memories. For example, cache/memory controller 1945 may be coupled to an L3 cache, which may in turn be coupled to a system memory. In other embodiments, cache/memory controller 1945 may be directly coupled to a memory. In some embodiments, cache/memory controller 1945 may include one or more internal caches. Memory coupled to controller 1945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1920 to cause the computing device to perform functionality described herein.

Graphics unit 1975 may include one or more processors, e.g., one or more graphics processing units (GPUs). Graphics unit 1975 may receive graphics-oriented instructions, such as OPENGL®, Metal®, or DIRECT3D® instructions, for example. Graphics unit 1975 may execute specialized GPU instructions or perform other operations based on the received graphics-oriented instructions. Graphics unit 1975 may generally be configured to process large blocks of data in parallel and may build images in a frame buffer for output to a display, which may be included in the device or may be a separate device. Graphics unit 1975 may include transform, lighting, triangle, and rendering engines in one or more graphics processing pipelines. Graphics unit 1975 may output pixel information for display images. Graphics unit 1975, in various embodiments, may include programmable shader circuitry which may include highly parallel execution cores configured to execute graphics programs, which may include pixel tasks, vertex tasks, and compute tasks (which may or may not be graphics-related).

One or more of coprocessor 1980 may be used to implement particular operations. In some embodiments coprocessor 1980 may implement particular operations more efficiently than a general-purpose processor. In various embodiments, coprocessors 1980 include optimizations and/or specialized hardware not typically implemented by core processors in compute complex 1920. In an embodiment, coprocessor 1980 implements vector and matrix operations. Coprocessors 300 and 400 described herein are examples of a coprocessor 1980.

Display unit 1965 may be configured to read data from a frame buffer and provide a stream of pixel values for display. Display unit 1965 may be configured as a display pipeline in some embodiments. Additionally, display unit 1965 may be configured to blend multiple frames to produce an output frame. Further, display unit 1965 may include one or more interfaces (e.g., MIPI® or embedded display port (eDP)) for coupling to a user display (e.g., a touchscreen or an external display).

I/O bridge 1950 may include various elements configured to implement: universal serial bus (USB) communications, security, audio, and low-power always-on functionality, for example. I/O bridge 1950 may also include interfaces such as pulse-width modulation (PWM), general-purpose input/output (GPIO), serial peripheral interface (SPI), and inter-integrated circuit (I2C), for example. Various types of peripherals and devices may be coupled to device 1900 via I/O bridge 1950.

In some embodiments, device 1900 includes network interface circuitry (not explicitly shown), which may be connected to fabric 1910 or I/O bridge 1950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1900 with connectivity to various types of other devices and networks.

Example Applications

Figure 20:
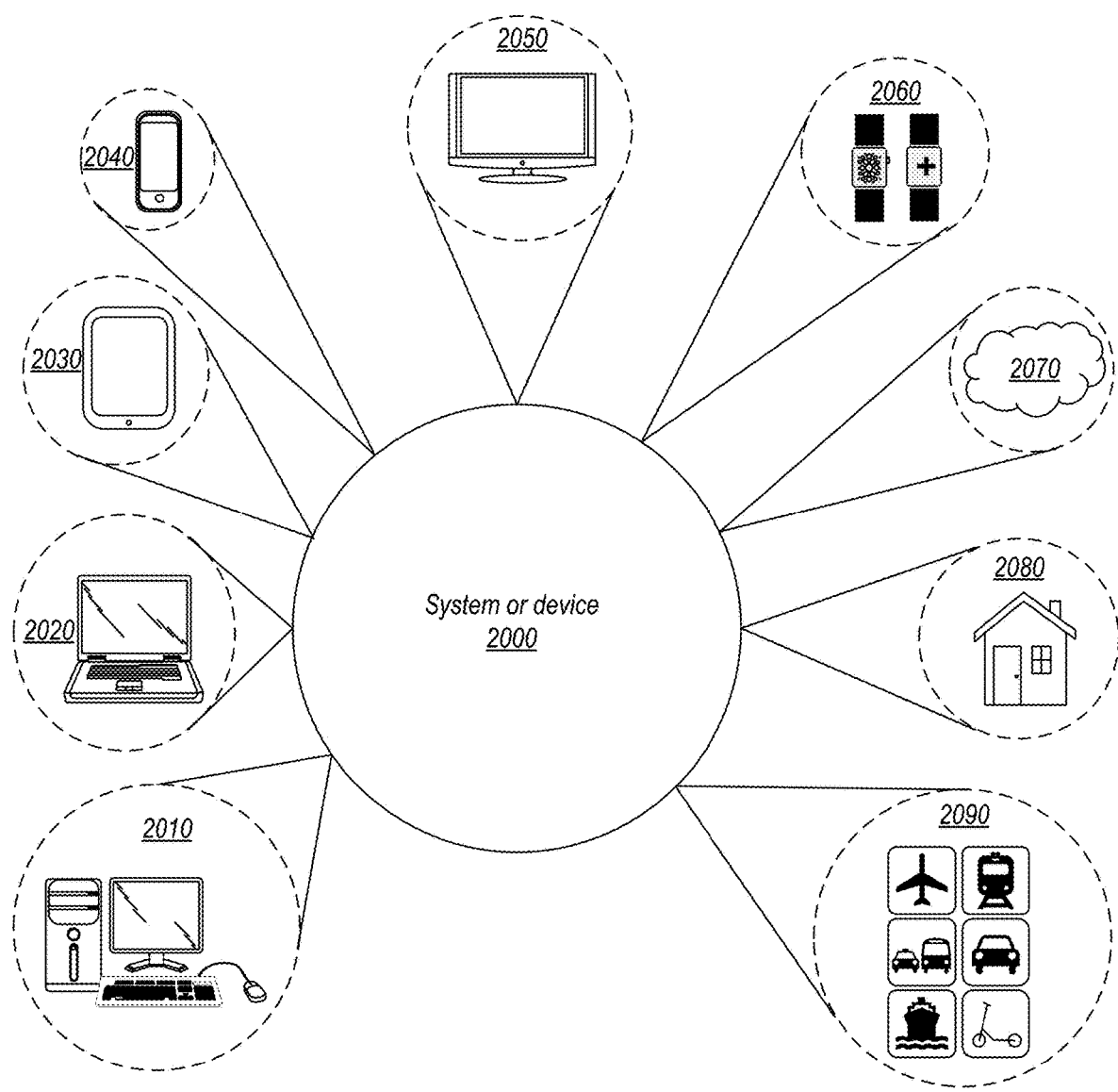
FIG. 20 is a block diagram illustrating an example computing device that is usable in various types of systems, according to some embodiments.

Turning now to FIG. 20, various types of systems that may include any of the circuits, devices, or system discussed above are shown. System or device 2000, which may incorporate or otherwise utilize one or more of the techniques described herein, may be utilized in a wide range of areas. For example, system or device 2000 may be utilized as part of the hardware of systems such as a desktop computer 2010, laptop computer 2020, tablet computer 2030, cellular or mobile phone 2040, or television 2050 (or set-top box coupled to a television).

Similarly, disclosed elements may be utilized in a wearable device 2060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 2000 may also be used in various other contexts. For example, system or device 2000 may be utilized in the context of a server computer system, such as a dedicated server or on shared hardware that implements a cloud-based service 2070. Still further, system or device 2000 may be implemented in a wide range of specialized everyday devices, including devices 2080 commonly found in the home such as refrigerators, thermostats, security cameras, etc. The interconnection of such devices is often referred to as the "Internet of Things" (IoT). Elements may also be implemented in various modes of transportation. For example, system or device 2000 could be employed in the control systems, guidance systems, entertainment systems, etc. of various types of vehicles 2090.

The applications illustrated in FIG. 20 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 21:
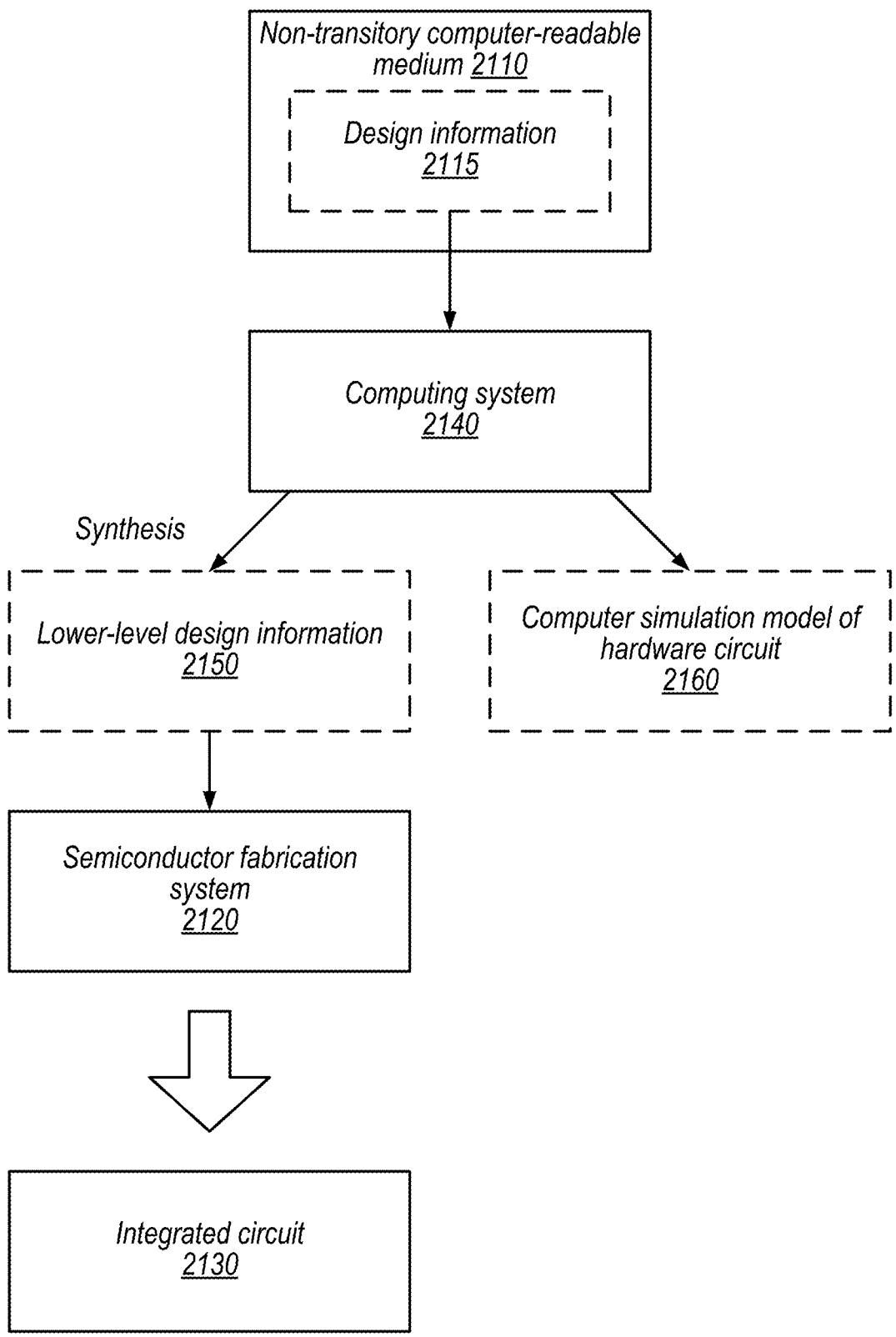
FIG. 21 is a block diagram illustrating a computer-readable storage medium storing circuit design information for a computing device, according to some embodiments.

FIG. 21 is a block diagram illustrating an example non-transitory computer-readable storage medium that stores circuit design information, according to some embodiments. In the illustrated embodiment, computing system 2140 is configured to process the design information. This may include executing instructions included in the design information, interpreting instructions included in the design information, compiling, transforming, or otherwise updating the design information, etc. Therefore, the design information controls computing system 2140 (e.g., by programming computing system 2140) to perform various operations discussed below, in some embodiments.

In the illustrated example, computing system 2140 processes the design information to generate both a computer simulation model 2160 of a hardware circuit and lower-level design information 2150. In other embodiments, computing system 2140 may generate only one of these outputs, may generate other outputs based on the design information, or both. Regarding the computing simulation, computing system 2140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 2140 also processes the design information to generate lower-level design information 2150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 2150 (potentially among other inputs), semiconductor fabrication system 2120 is configured to fabricate an integrated circuit 2130 (which may correspond to functionality of the simulation model 2160). Note that computing system 2140 may generate different simulation models based on design information at various levels of description, including information 2150, 2115, and so on. The data representing design information 2150 and model 2160 may be stored on medium 2110 or on one or more other media.

In some embodiments, the lower-level design information 2150 controls (e.g., programs) the semiconductor fabrication system 2120 to fabricate the integrated circuit 2130. Thus, when processed by the fabrication system, the design information may program the fabrication system to fabricate a circuit that includes various circuitry disclosed herein.

Non-transitory computer-readable storage medium 2110 may comprise any of various appropriate types of memory devices or storage devices. Non-transitory computer-readable storage medium 2110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2110 may include other types of non-transitory memory as well or combinations thereof. Accordingly, non-transitory computer-readable storage medium 2110 may include two or more memory media; such media may reside in different locations—for example, in different computer systems that are connected over a network.

Design information 2115 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 2140, semiconductor fabrication system 2120, or both. In some embodiments, design information may also include one or more cell libraries that specify the synthesis, layout, or both of integrated circuit 2130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 2130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 2120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2120 may also be configured to perform various testing of fabricated circuits for correct operation.

In various embodiments, integrated circuit 2130 and model 2160 are configured to operate according to a circuit design specified by design information 2115, which may include performing any of the functionality described herein. For example, integrated circuit 2130 may include any of various elements shown in FIGS. 1-8 and 15-16. Further, integrated circuit 2130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 2120 to fabricate integrated circuit 2130.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A processor, comprising:
operand management circuitry including a fusion buffer, wherein the operand management circuitry is configured to:
  receive instruction operations;
  detect, from among the received instruction operations, a first storage instruction operation that is executable to store, into one or more destination registers, one or more first operand values usable by one or more consumer instruction operations;
  store the first storage instruction operation in the fusion buffer instead of allowing the first storage instruction operation to proceed along an execution pipeline of the processor;
  in response to detecting a drop condition associated with the first storage instruction operation, remove the first storage instruction operation from the fusion buffer without forwarding the first storage instruction operation for execution, so that the one or more first operand values are not written to the one or more destination registers; and
  in response to detecting a buffer vacate condition and not detecting the drop condition, remove the first storage instruction operation from the fusion buffer and forward the first storage instruction operation for execution; and
execution circuitry coupled to the operand management circuitry and configured to execute instruction operations including the first storage instruction operation.

2. The processor of claim 1, wherein:
the operand management circuitry is further configured to, in response to detecting, from among the received instruction operations, a first consumer instruction operation while the first storage instruction operation is in the fusion buffer, fuse the first storage instruction operation and first consumer instruction operation into one or more first fused instruction operations;
the first consumer instruction operation is eligible for fusion with the first storage instruction operation and is executable to use one or more of the one or more first operand values to perform a first operation;
the first fused instruction operations are executable to obtain the one or more of the one or more first operand values and perform the first operation without writing the one or more of the one or more first operand values to the one or more destination registers; and
the execution circuitry is further configured to execute instruction operations including the first fused instruction operations.

3. The processor of claim 2, wherein:
the operand management circuitry is further configured to, in response to detecting an additional consumer instruction operation while the first storage instruction operation is in the fusion buffer, fuse the first storage instruction operation and the additional consumer instruction operation into one or more additional fused instruction operations; and
the additional consumer instruction operation is eligible for fusion with the first storage instruction operation and is executable to use one or more of the one or more first operand values to perform an additional operation.

4. The processor of claim 1, wherein detecting a drop condition associated with the first storage instruction operation includes determining that there are no more current or future consumer instruction operations for the first storage instruction operation.

5. The processor of claim 1, wherein detecting a buffer vacate condition includes detecting, from among the received instruction operations, a second storage instruction operation that is executable to store one or more second operand values usable by one or more consumer instruction operations.

6. The processor of claim 1, wherein the first storage instruction operation includes lookup table index values and is executable to use the index values to obtain the one or more first operand values from a lookup table.

7. The processor of claim 2, wherein the first storage instruction operation is executable to move portions of a storage array to the one or more destination registers to form the one or more first operand values.

8. The processor of claim 7, wherein the first consumer instruction operation is executable to reduce a bit width of one or more of the one or more first operand values.

9. The processor of claim 7, wherein:
the first consumer instruction operation is executable to interleave or de-interleave elements of the one or more first operand values; and
the execution circuitry includes interleave execution circuitry.

10. A method, comprising:
detecting, by operand management circuitry in a processor and among instruction operations received by the operand management circuitry, a first storage instruction operation that is executable to store, into one or more destination registers, one or more first operand values usable by one or more consumer instruction operations;
storing, by the operand management circuitry, the first storage instruction operation into a fusion buffer of the processor instead of allowing the first storage instruction operation to proceed along an execution pipeline of the processor;
in response to detecting a buffer vacate condition, removing, by the operand management circuitry, the first storage instruction operation from the fusion buffer;

checking for a drop condition associated with the first storage instruction operation; and based on a result of the checking and after removing the first storage instruction operation from the fusion buffer, processing the first storage instruction operation.

11. The method of claim 10, wherein:
the result of the checking includes detecting the drop condition; and
the processing includes dropping the first storage instruction operation without forwarding the first storage instruction operation for execution, so that the one or more first operand values are not written to the one or more destination registers.

12. The method of claim 10, wherein:
the result of the checking does not include detecting the drop condition; and
the processing includes forwarding the first storage instruction operation for execution.

13. The method of claim 10, further comprising:
in response to detecting, from among the instruction operations received by the operand management circuitry, a first consumer instruction operation while the first storage instruction operation is in the fusion buffer, fusing, by the operand management circuitry, the first storage instruction operation and the first consumer instruction operation into one or more first fused instruction operations, wherein
the first consumer instruction operation is eligible for fusion with the first storage instruction operation and is executable to use one or more of the one or more first operand values to perform a first operation, and
the first fused instruction operations are executable to obtain the one or more of the one or more first operand values and perform the first operation without writing the one or more of the one or more first operand values to the one or more destination registers.

14. The method of claim 13, further comprising:
in response to detecting, from among the instruction operations received by the operand management circuitry, an additional consumer instruction operation while the first storage instruction operation is in the fusion buffer, fusing, by the operand management circuitry, the first storage instruction operation and the additional consumer instruction operation into one or more second fused instruction operations, wherein the additional consumer instruction operation is eligible for fusion with the first storage instruction operation and is executable to use one or more of the one or more first operand values to perform an additional operation.

15. The method of claim 10, wherein checking for the drop condition associated with the first storage instruction operation includes determining whether there are any more current or future consumer instruction operations for the first storage instruction operation.

16. The method of claim 10, wherein detecting the buffer vacate condition includes detecting, from among the instruction operations received by the operand management circuitry, a second storage instruction operation that is executable to store one or more second operand values usable by one or more consumer instruction operations.

17. A non-transitory computer readable medium having stored thereon design information that specifies, in a format recognized by a fabrication system that is configured to use the design information, at least a portion of a circuit design for a processor, the processor comprising:
operand management circuitry including a fusion buffer, wherein the operand management circuitry is configured to:
receive instruction operations;
detect, from among the received instruction operations, a first storage instruction operation that is executable to store, into one or more destination registers, one or more first operand values usable by one or more consumer instruction operations;
store the first storage instruction operation in the fusion buffer instead of allowing the first storage instruction operation to proceed along an execution pipeline of the processor;
in response to detecting a drop condition associated with the first storage instruction operation, remove the first storage instruction operation from the fusion buffer without forwarding the first storage instruction operation for execution, so that the one or more first operand values are not written to the one or more destination registers; and
in response to detecting a buffer vacate condition and not detecting the drop condition, remove the first storage instruction operation from the fusion buffer and forward the first storage instruction operation for execution; and
execution circuitry coupled to the operand management circuitry and configured to execute instruction operations including the first storage instruction operation.

18. The computer readable medium of claim 17, wherein:
the operand management circuitry is further configured to, in response to detecting, from among the received instruction operations, a first consumer instruction operation while the first storage instruction operation is in the fusion buffer, fuse the first storage instruction operation and first consumer instruction operation into one or more first fused instruction operations;
the first consumer instruction operation is eligible for fusion with the first storage instruction operation and is executable to use one or more of the one or more first operand values to perform a first operation;
the first fused instruction operations are executable to obtain the one or more of the one or more first operand values and perform the first operation without writing the one or more of the one or more first operand values to the one or more destination registers; and
the execution circuitry is further configured to execute instruction operations including the first fused instruction operations.

19. The computer readable medium of claim 17, wherein the first storage instruction operation includes lookup table index values and is executable to use the index values to obtain the one or more first operand values from a lookup table.

20. The computer readable medium of claim 17, wherein the processor is a coprocessor configured to perform vector and matrix operations.

* * * * *

UNITED STATES PATENT AND TRADEMARK OFFICE
CERTIFICATE OF CORRECTION

| | | |
|---|---|---|
| PATENT NO. | : 12,340,222 B2 | Page 1 of 1 |
| APPLICATION NO. | : 18/628403 | |
| DATED | : June 24, 2025 | |
| INVENTOR(S) | : Ran Aharon Chachick et al. | |

It is certified that error appears in the above-identified patent and that said Letters Patent is hereby corrected as shown below:

In the Specification

In Column 14, Lines 6-7, please delete "of operands of operands associated" and insert -- of operands associated --.

Signed and Sealed this
Seventh Day of October, 2025

John A. Squires
*Director of the United States Patent and Trademark Office*